(12) United States Patent
Pettigrew

(10) Patent No.: US 6,496,599 B1
(45) Date of Patent: Dec. 17, 2002

(54) FACILITATING THE COMPOSITING OF VIDEO IMAGES

(75) Inventor: Daniel Pettigrew, Montreal (CA)

(73) Assignee: Autodesk Canada Inc., Montreal (CA)

( * ) Notice: Subject to any disclaimer, the term of this patent is extended or adjusted under 35 U.S.C. 154(b) by 0 days.

(21) Appl. No.: 09/282,463

(22) Filed: Mar. 31, 1999

(30) Foreign Application Priority Data

Apr. 1, 1998 (GB) .............................................. 9806975

(51) Int. Cl.⁷ ................................................ G06K 9/00
(52) U.S. Cl. ........................ 382/162; 348/587; 348/592
(58) Field of Search ................................. 382/162–167, 382/282–284, 225, 199; 358/450–453, 461, 448, 530, 517, 520, 523, 525, 537, 538, 540; 348/584–599, 615; 345/620–641

(56) References Cited

U.S. PATENT DOCUMENTS

| | | | |
|---|---|---|---|
| 5,301,016 A | | 4/1994 | Gehrmann |
| 5,347,622 A | | 9/1994 | Takemoto et al. |
| 5,355,174 A | | 10/1994 | Mishima |
| 5,404,316 A | * | 4/1995 | Klingler et al. ............. 345/723 |
| 5,455,633 A | | 10/1995 | Gehrmann |
| 5,630,037 A | * | 5/1997 | Schindler et al. ........... 382/164 |
| 5,719,640 A | | 2/1998 | Gehrmann |
| 5,852,673 A | * | 12/1998 | Young ......................... 382/164 |
| 5,887,082 A | * | 3/1999 | Mitsunaga et al. .......... 382/164 |
| 5,986,771 A | * | 11/1999 | Henderson et al. ......... 358/450 |
| 6,011,595 A | * | 1/2000 | Henderson et al. ......... 348/590 |
| 6,134,346 A | * | 10/2000 | Berman et al. ............. 382/163 |

FOREIGN PATENT DOCUMENTS

| | | | |
|---|---|---|---|
| EP | 0735 511 A2 | 10/1996 | |
| EP | 0776136 A1 | 5/1997 | |
| FR | 2681967 | 4/1993 | |
| GB | 2262860 A | 6/1993 | |
| GB | 2270439 A | 3/1994 | |
| GB | 2312348 A | 10/1997 | |
| WO | 96/29829 | * 9/1996 | ............ H04N/9/75 |
| WO | WO 98/11510 | 3/1998 | |

* cited by examiner

*Primary Examiner*—Jingge Wu
(74) *Attorney, Agent, or Firm*—Gates & Cooper LLP

(57) ABSTRACT

Image data taking the form of a plurality of image pixels is processed. A three dimensional representation of color-space is displayed and the color of pixels within the processed image are analysed such that said analysed pixels are displayed at color related positions within the displayed color-space.

14 Claims, 28 Drawing Sheets

$$r_c = \frac{r_{min} + r_{max}}{2}$$

$$g_c = \frac{g_{min} + g_{max}}{2}$$

$$b_c = \frac{b_{min} + b_{max}}{2}$$

Figure 10

$$r_s = \frac{r_{max} - r_{min}}{2}$$

$$g_s = \frac{g_{max} - g_{min}}{2}$$

$$b_s = \frac{b_{max} - b_{min}}{2}$$

Figure 11

$$C_{r,r} = \frac{\sum_{0 \leq i < N} r^2{}_i}{N} - \mu_r^2$$

$$C_{g,g} = \frac{\sum_{0 \leq i < N} g_i^2}{N} - \mu_g^2$$

$$C_{b,b} = \frac{\sum_{0 \leq i < N} b_i^2}{N} - \mu_b^2$$

$$C_{r,g} = C_{g,r} = \frac{\sum_{0 \leq i < N} C_r C_g}{N} - \mu_r \mu_g$$

$$C_{r,b} = C_{b,r} = \frac{\sum_{0 \leq i < N} C_r C_b}{N} - \mu_r \mu_b$$

$$C_{g,b} = C_{b,g} = \frac{\sum_{0 \leq i < N} C_r C_b}{N} - \mu_r \mu_b$$

$$\text{where } \mu_r = \frac{\sum_{0 \leq i < N} r_i}{N}, \quad \mu_g = \frac{\sum_{0 \leq i < N} g_i}{N}$$

$$\mu_b = \frac{\sum_{0 \leq i < N} b_i}{N}$$

*Figure 13*

$$MC = \begin{pmatrix} c_{r,r} & c_{r,g} & c_{r,b} \\ c_{g,r} & c_{g,g} & c_{g,b} \\ c_{b,r} & c_{b,g} & c_{b,b} \end{pmatrix}$$

from which eigervectors u v & w are calculated to give a tansformation matrix such that:

$$\begin{pmatrix} u_1 & u_2 & u_3 \\ v_1 & v_2 & v_3 \\ w_1 & w_2 & w_3 \end{pmatrix} \begin{pmatrix} r_i \\ g_i \\ b_i \end{pmatrix}$$

achieves the desired rotation in colour space.

*Figure 14*

$$\text{Softness} = \cfrac{w - \frac{w}{b}}{1 - \frac{w}{b}}$$

$$= \cfrac{wb - w}{b - w}$$

where   $0 < \text{Softness} < 1.0$

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0.3 | 0 | 0 | 0 | 0 | 0 | 0 | 0 |
| 0.9 | 0.4 | 0 | 0 | 0 | 0 | 0 | 0 |
| 0.8 | 0.8 | 0.5 | 0 | 0 | 0 | 0 | 0 |
| 0.3 | 0.4 | 0.6 | 0.3 | 0 | 0 | 0 | 0 |
| 0 | 0 | 0 | 0.3 | 0.2 | 0 | 0 | 0 |
| 0 | 0 | 0 | 0 | 0.2 | 0 | 0 | 0 |

*Figure 24*

FACILITATING THE COMPOSITING OF VIDEO IMAGES

FIELD OF THE INVENTION

The present invention relates to the processing of image data, wherein said data takes the form of a plurality of image pixels.

INTRODUCTION TO THE INVENTION

Many procedures for the modification of image data after the data has been recorded are known and are collectively referred to as post production. It is known to use analogue circuitry for modifying television and video signals, in which said signals may be represented as red, green and blue components or as luminance plus chrominance components. When working with video signals, part of the information may be removed or keyed out at particular times or positions within the image, defined by a synchronised key, matte or alpha signal. Alternatively, parts of the video signal may be suppressed to black in response to a suppression signal. These keying or suppression signals may be derived from part of the video image itself, often with reference to particular colours within the image in accordance with a process generally referred to as chroma-keying.

It is also known to modify digital representations of video images derived by sampling an image to produce an array of picture elements (pixels) in which each of said pixels may represent a colour defined by three colour components stored as three numerical values. Thus, it is known to represent each of red, green and blue colour components by respective eight-bit words representing the colour of the pixel at particular positions within the image array.

When chroma-keying techniques are to be employed, it is preferable for the production process to record the information in such a way as to facilitate the chroma-keying process. Thus, it is preferable for foreground talent to be recorded against a saturated blue or green background for example, thereby allowing any portions of the image which are perceived as being saturated blue or green as belonging to part of the keying signal. However, in many situations where it would be desirable to employ post-production techniques, the original source material will have been recorded under less than favourable conditions. Under these circumstances, it can become difficult to accurately define those colours which are to constitute part of the full key, those colours which are to constitute part of the full key-off and those colours which are used to generate a blending between the two extremes, in an area which may be considered as the key softness.

In many situations it may be possible to define a first set of colours for full key-on in combination with a second set of colours for full key-off. However, an appropriate interface has to be provided to a user to enable a selection to be made and in many known environments, although distinctive sets of colours do exist, it is possible that the controls available to an operator would not be sufficiently sophisticated in order for these regions to be clearly defined. In these circumstances, it is known for the key to be generated in several passes or for part of the image to be dealt with in a different way, possibly by the generation of an appropriate garbage mask. All of these known approaches tend to increase the expertise and time required in order to generate an appropriate chroma-key, thereby significantly limiting the availability of the technique.

A system in which each pixel is represented by three colour components defining a position within colour-space is disclosed in International patent publication WO 98/11510. A base colour is identified and a distance in colour-space between an input colour and said base colour is calculated. The control value, which may be used as a basis for a chroma suppress or a chroma-key etc, is produced in response to the calculated distance.

The system disclosed in the aforesaid patent publication provides improved procedures for producing a chroma-key thereby achieving improved chroma-keying results. However, the problem with the system disclosed in this publication is that it is difficult for users to control operational parameters so as to make optimum use of the processing facilities available.

SUMMARY OF THE INVENTION

According to a first aspect of the present invention there is provided a method of processing image data wherein said data takes the form of a plurality of image pixels, comprising steps of displaying a three dimensional representation of colour-space; analysing the colour of pixels within said image; and displaying said analysed pixels at colour related positions within said displayed colour-space.

In a preferred embodiment, the pixels have a unifying property and this property may be that the pixels belong to a background area which is to be replaced by a new background area. The background area may be selected by viewing an image, manually adjusting a cursor in response to activation of an interface device and selecting example pixels of the background image.

In a preferred embodiment, the method further comprises the steps of determining the position of a volume in colour-space that contains the displayed pixels and displaying said bounding volume. The bounding volume may be a cuboid, a minimised convex hull or an ellipsoid. The geometry of the displayed bounding volume may be adjusted by manual operation of an interface device.

In a preferred embodiment, pixels displayed in colour-space are displayed substantially in their original colour.

According to a second aspect of the present invention, there is provided image processing apparatus configured to process data taking the form of a plurality of image pixels, comprising display means configured to display a three-dimensional representation of colour-space; analysing means configured to analyse the colour of pixels within said image; and processing means configured to supply analysed pixels to said display means at colour related positions within said displayed colour-space.

BRIEF DESCRIPTION OF THE DRAWINGS

FIG. 10 illustrates the equations used to determine the centre of the bounding box shown in FIG. 9;

FIG. 11 illustrates the equations used to determine scaling factors in colour-space to normalise the box shown in FIG. 9 to a cube;

FIG. 13 details preliminary equations used to determine eigenvectors from the convex hull shown in FIG. 8;

FIG. 14 details additional equations including eigenvectors for determining a rotation matrix required to locate the cube as shown in FIG. 12;

FIG. 24 illustrates pixel detail of foreground talent shown in FIG. 2;

DETAILED DESCRIPTION OF THE PREFERRED EMBODIMENT

The invention will now be described by way of example only, with reference to the drawings identified above.

Figure 1:
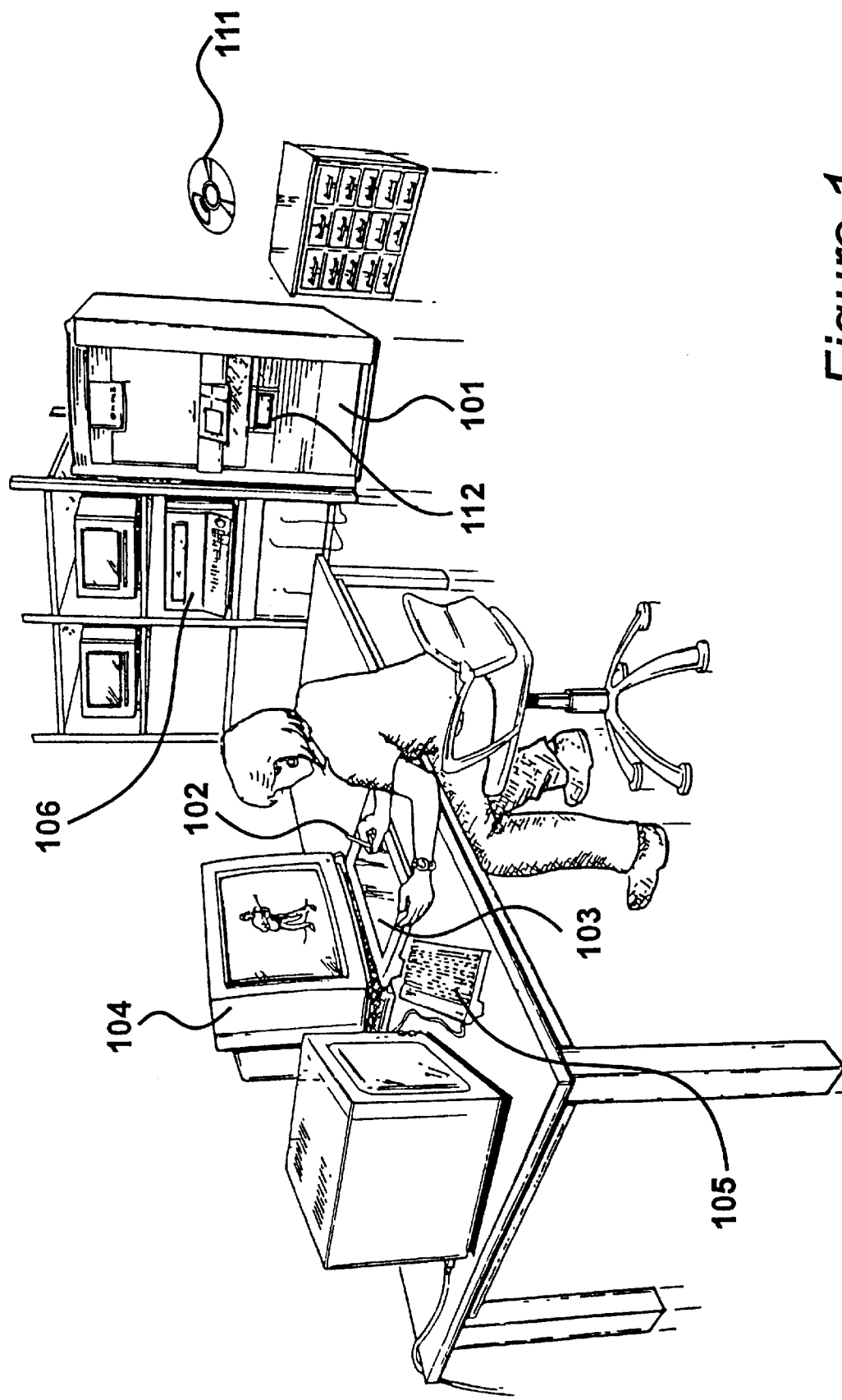
FIG. 1 shows a compositing station arranged to combine images using a process of chroma-keying, including a processing system.

An image processing station is shown in FIG. 1, in which an image processing system 101 includes interface circuitry arranged to receive indications of the position of a user operated stylus 102 with respect to a position in two dimensions upon a graphics tablet 103. Video signals are supplied from the processing system 101 to a visual display unit 104. A keyboard 105 may be operated by the user in order to facilitate additional control operations. A high definition image recorder 106 supplies image data to the processing system 101, and may also receive processed image data back from the processing system 101. Image data may also be supplied to and from a data network.

Operating instructions executable by the processing system 101 are received by means of a computer-readable medium such as a CD ROM 111 receivable within a CD ROM player 112.

By operating the stylus 102, or keyboard 105, the user may command the processing system 101 to perform a sequence of processing events for compositing frames of image data. An image clip consists of a sequence of frames, and each frame is considered as a two dimensional array of image pixels at a resolution appropriate to the destination medium. Thus, for image data that will be transferred to cinematographic film, a resolution of two thousand by two thousand pixels would be used. Each pixel in the image contains red, green and blue (RGB) components, thereby defining the luminance of each of the three primary colours for each pixel.

In addition to displaying image frames, the monitor 104 also provides the user with a graphical user interface (GUI) such that various image processing commands may be activated by movement of a stylus-controlled cursor on the screen, in combination with pressing a button on the stylus, or appropriate commands, simultaneous or otherwise, from the keyboard 105. In this way a comprehensive image processing environment is provided, in which a user may perform image processing operations upon source image data, the results of which may be stored once the desired result has been achieved. In the environment shown in FIG. 1, the processing system is typically required to perform similar or identical image processing operations upon consecutive frames of image data. A group of consecutive frames is considered as a clip.

Figure 2:
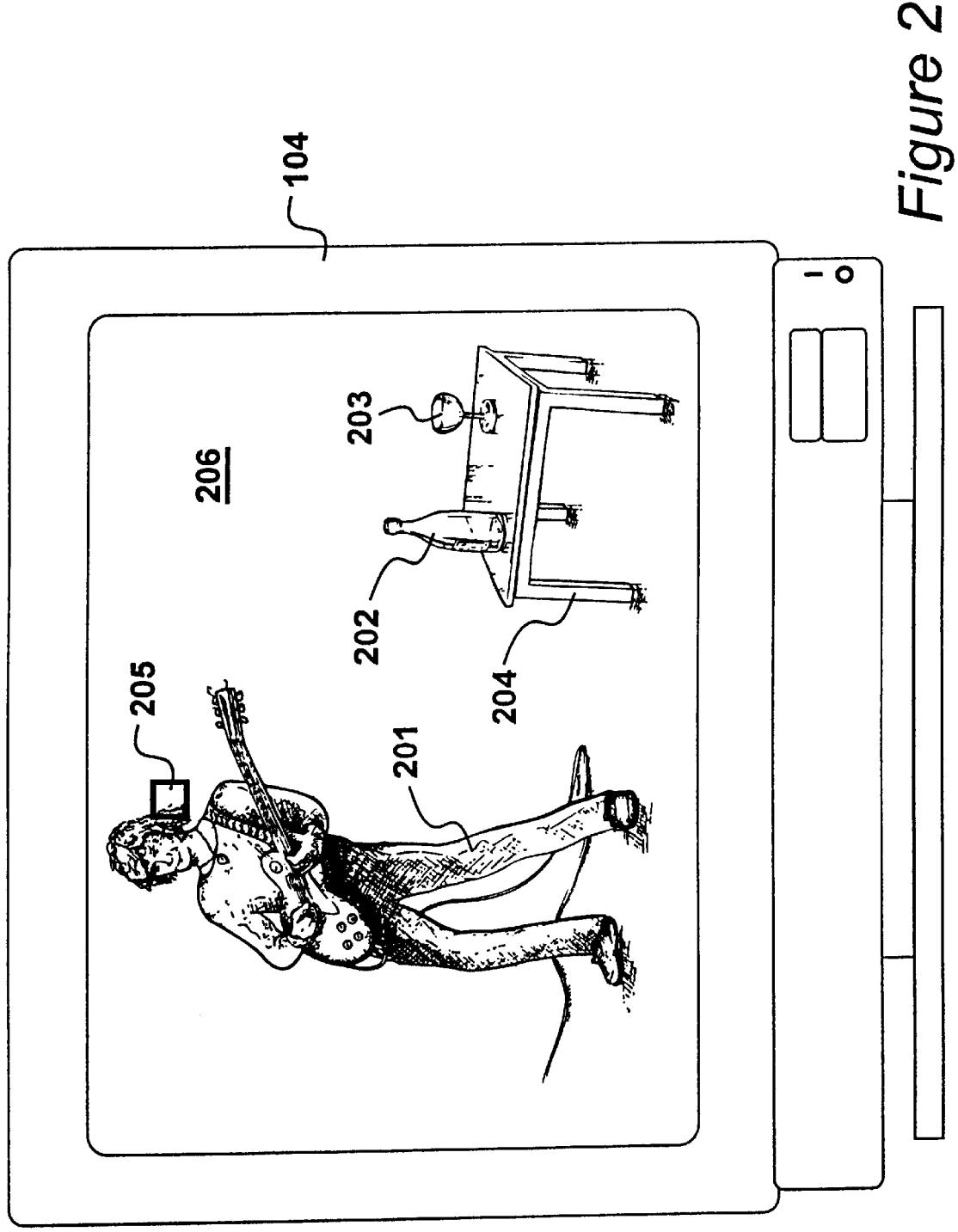
FIG. 2 shows an example of a foreground image to be composited against a new background image, using the equipment identified in FIG. 1, and including foreground talent.

Compositing is a primary task of the image processing station shown in FIG. 1. Compositing involves the combination of images, one of which may represent a foreground, while another may represent a background. In order to combine the images automatically, it is necessary for the foreground image to include a background having clearly definable properties. Typically, this means shooting the foreground against a blue background. An example of a foreground image shot in this way is shown in FIG. 2. The foreground talent 201, in this example a guitarist, is clearly visible against a blue background 206. The blue background is created in studio by painted board covering the walls and floors and all other angles visible to the camera. Additional foreground items may be included such as a wine bottle 202 and a wine glass 203 upon a table 204.

Figure 3:
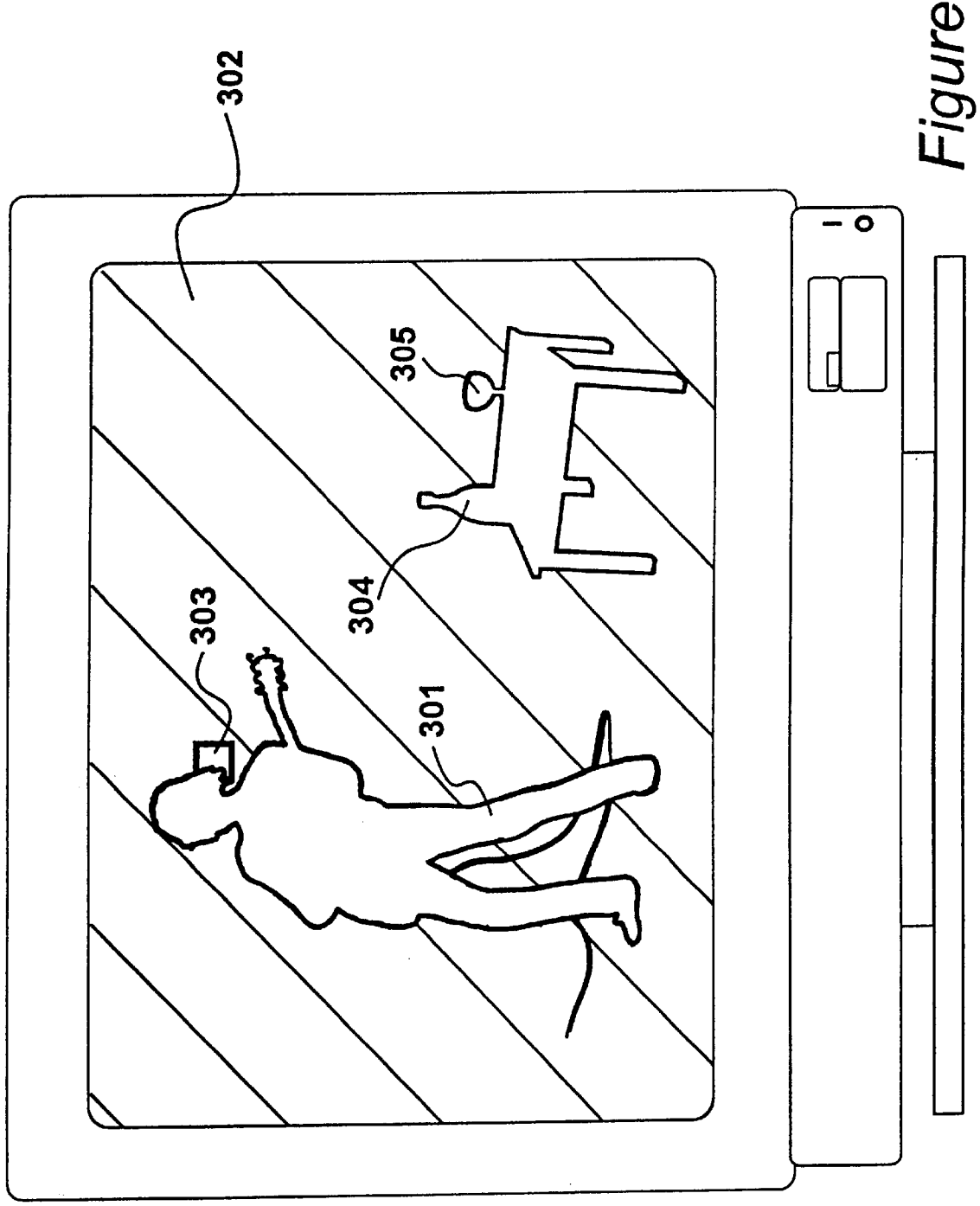
FIG. 3 illustrates a key, matte or alpha signal generated from the image shown in FIG. 2.

A process may be used to detect the blue colour in the foreground image in order to create a matte, in which all the blue is replaced by a pure black colour value, and all the foreground is replaced by a pure white colour value. A matte is not a collection of RGB pixels like the main image data, as each individual matte pixel only needs to be represented by a value of zero, for black, through to 1.0 for white. A matte resulting from the foreground image shown in FIG. 2 is shown in FIG. 3. The talent 201 has been replaced by a plain white silhouette 301 against a plain black background, represented by shading 302.

Generation of the matte shown in FIG. 3 is complicated by border regions. Clearly the border between the background and foreground images will not cross exact pixel boundaries and for this reason an intermediate region for the matte along a border is defined by intermediate matte pixel values between black and white, represented by values in the range between 0.0 and 1.0. It is difficult to define a clear linear transition at a border region because the precise variation in RGB values is complex; due in part to the natural variation in the precise colour of the blue sheet used as a background and also the possibility of a degree of blue component being included within valid parts of a foreground image. Even more difficult are translucent objects, such as the wine bottle 202 and glass 203.

Figure 4:
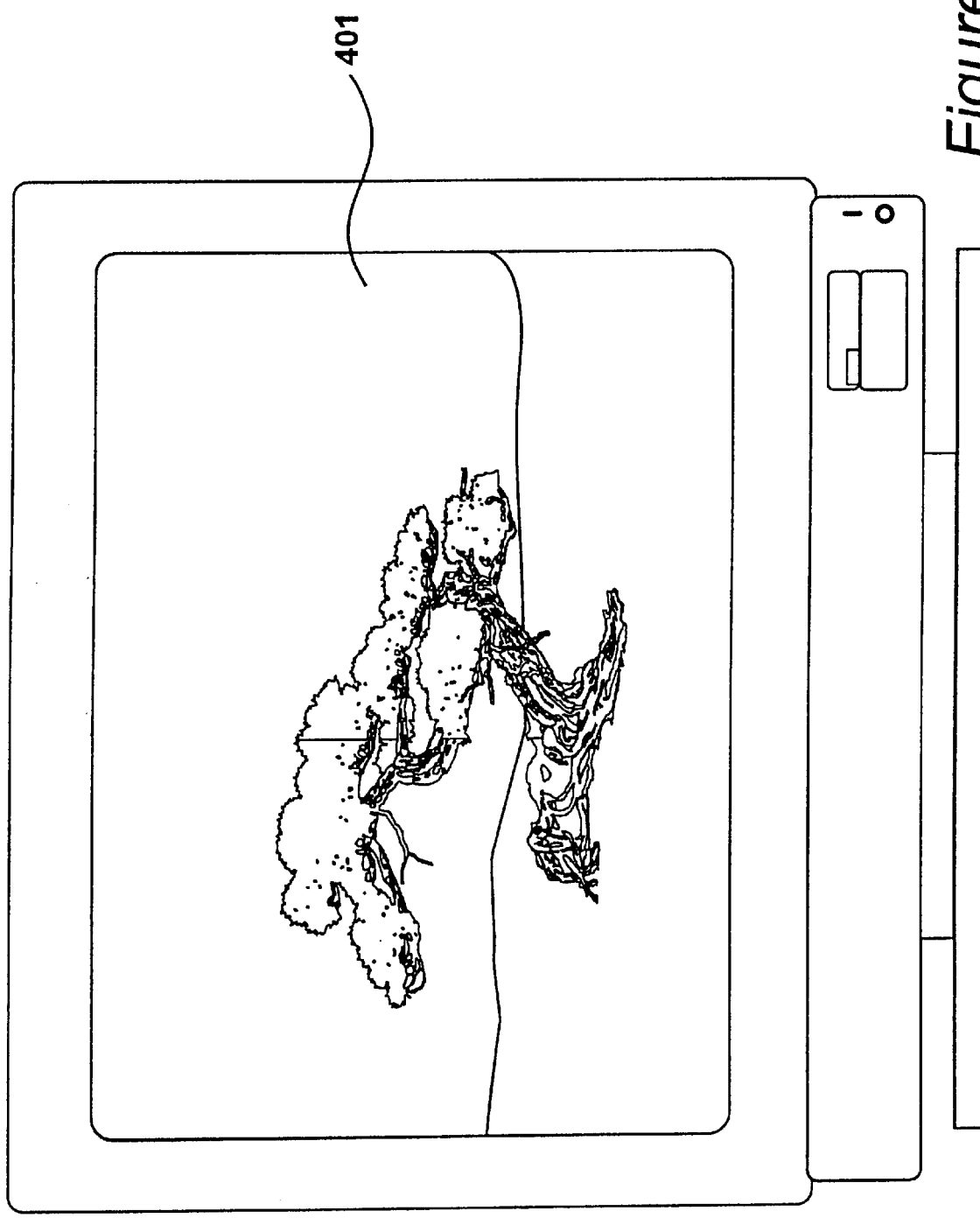
FIG. 4 illustrates a new background image, such that the foreground image shown in FIG. 2 will be composited against a new background image shown in FIG. 4 using the key signal illustrated in FIG. 3.

After a matte of the type shown in FIG. 3 has been generated from an image of the type shown FIG. 2, the matte may be used to combine the image shown in FIG. 2 against the new background, such as background 401 shown in FIG. 4.

Figure 5:
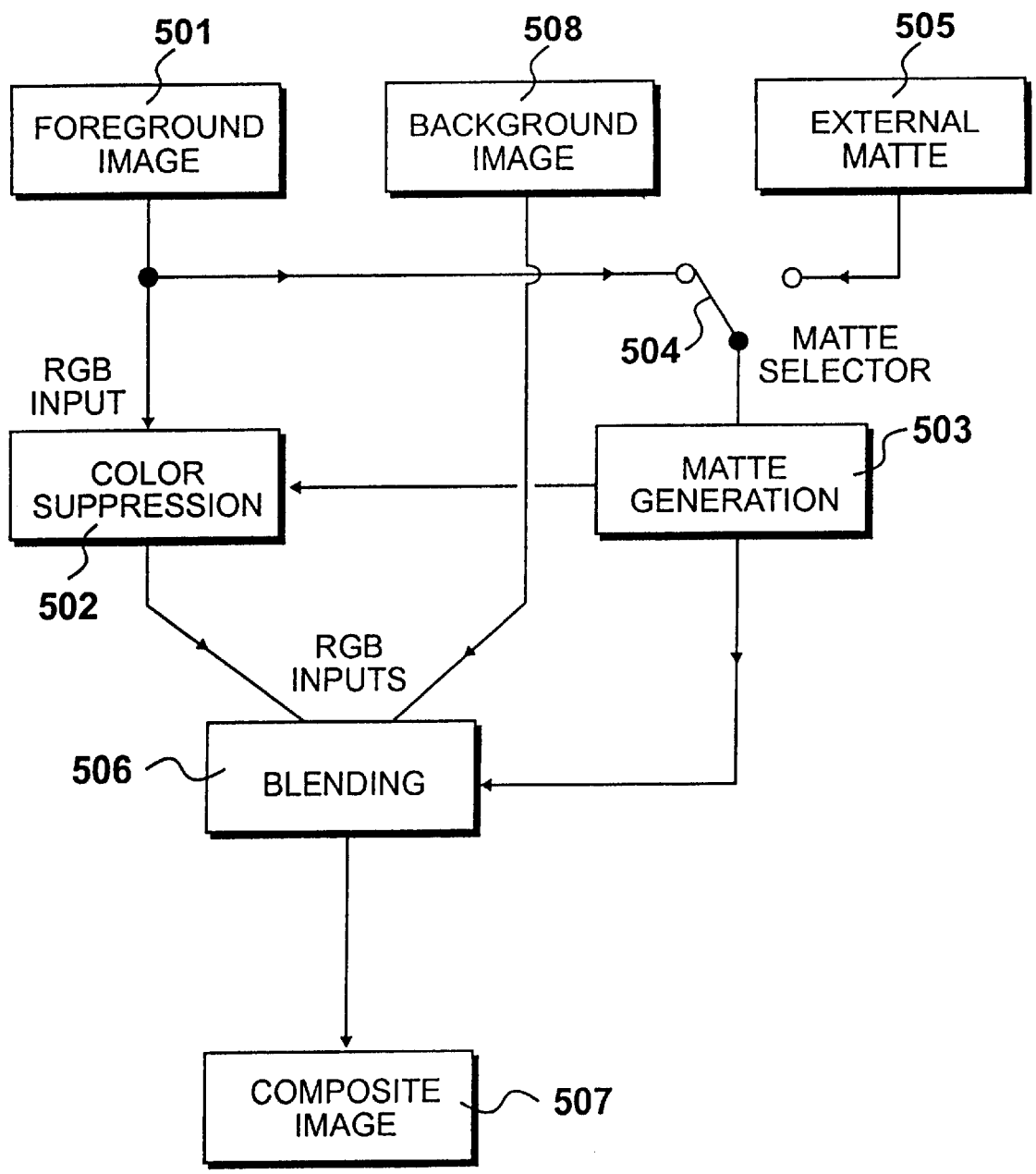
FIG. 5 illustrates a compositing process used for combining the foreground image of FIG. 1 against the background image of FIG. 4 by generating and using the key signal illustrated in FIG. 3, and which operates on the processing system shown in FIG. 1.

A summary of the processes performed by the processing system 101 is shown in FIG. 5. RGB pixel data for the foreground image 501 is supplied to a colour suppression process 502. When an image is shot against a blue background, bleeding occurs due to reflection of the blue light, and an unnatural predominance of blue can result. The colour suppression process 502 facilitates removal of such unwanted colour artefacts in the resulting image. The foreground image data 501 is also supplied to a matte generation process 503, which performs processing steps to generate matte pixel data, as indicated in FIG. 3. External matte data 505 may be selected via switch 504, if such data has already been prepared, for example, during a previous image processing session.

A blending process 506 receives colour-suppressed RGB foreground image pixel data, RGB background pixel data 508 and matte data. For each pixel in the matte a blend is performed, such that the proportion of each of the red, green and blue components in the foreground is proportional to the matte value, and the proportion of the red, green and blue components of the background is inversely proportional to the matte value. The resulting blended pixels form a composite image 507, which includes the foreground and the background in the required parts of the image.

The quality of the resulting composite image 507 is largely dependent upon the quality of the matte generation process 503. Problems arise in mapping an appropriate set of colours to the background, an appropriate set of colours to the foreground, and an intermediate set of colours which define a softness region between the two.

Figure 6:
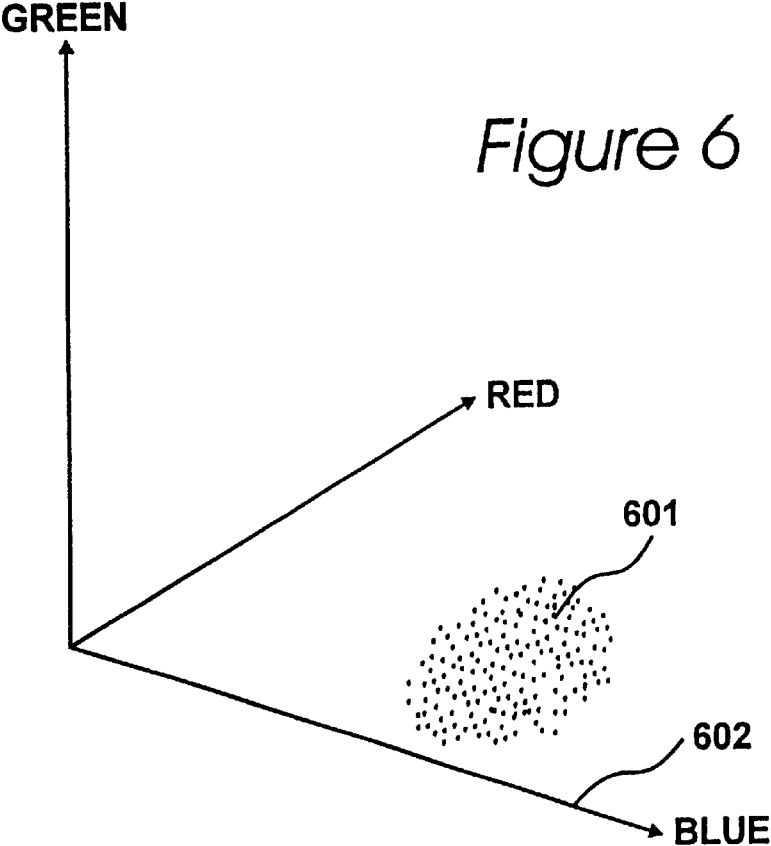
FIG. 6 illustrates pixels occupying in a volume of colour-space that represent a blue colour predominant in the foreground image shown in FIG. 2, and which is to be replaced by the background image shown in FIG. 4.

In accordance with procedures performed by the present embodiment, the background colour is considered as occupying a volume in colour-space. RGB colour-space is a volume having axes defined for the amplitudes of red, green and blue colour components. Thus, for a plurality of pixels whose RGB values are sampled from an area in an image of similar colour, such as the blue background, the pixels are displayed as occupying a particular volume of colour-space, as indicated in FIG. 6.

Image data, taking the form of a plurality of image pixels, is processed. The processing procedures are configured so as to provide signals to a visual display unit thereby displaying a three-dimensional representation of colour-space. Colour pixels forming an image are analysed and the analysed pixels are displayed at colour related positions within the displayed colour-space. Thus, a display is generated in which the geometric position of pixels relates to their colour only, with no bearing on their location within an original image frame.

A sample of blue pixels 601 is seen occupying a volume in colour-space, slightly away from the blue axis 602. A volume is defined by these pixels which includes all blue values that are valid for a corresponding matte area. Thus, by sampling background pixels, a region in colour-space is quickly defined which relates to the actual, rather than the intended, ideal blue value for the background which is to be replaced.

Figure 7:
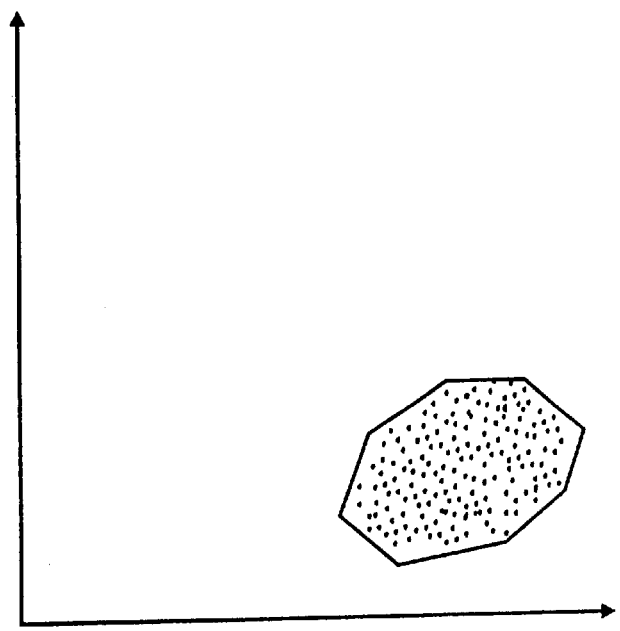
FIG. 7 illustrates a cross section of colour-space including the pixels identified in FIG. 6, including a line connecting the outermost of the identified pixels.
Figure 8:
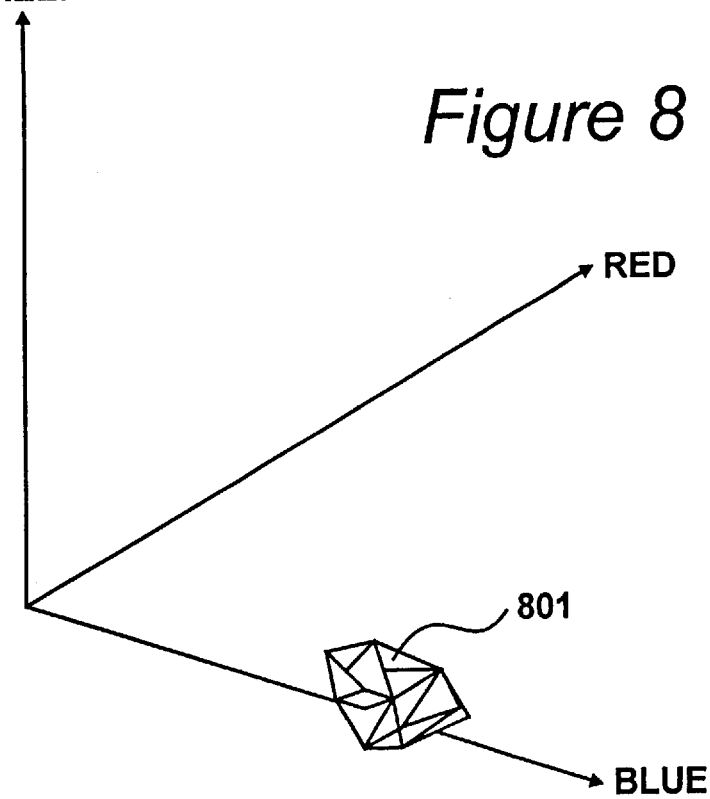
FIG. 8 illustrates the three dimensional equivalent of connecting the outermost pixels shown in FIG. 7, thereby forming a tessellated surface of a convex hull in colour-space.

A minimal volume which includes all sampled pixels is defined by a three dimensional equivalent of applying a rubber band around all the points. This may be more easily understood by viewing the problem in two dimensions of colour-space, as shown in FIG. 7. Here, all the sampled pixel RGB values have been bounded by the shortest lines that connect all of the outermost pixels. The three dimensional equivalent of this is shown in FIG. 8, and comprises a number of surface planes connected to form a three dimensional convex hull 801. Convex hull calculation is performed by the known process of Delaunay Triangulation. This process is described in "The Computer Journal", Volume 24, Number 2, 1981 starting on page 167. The purpose of performing this operation is to define a set of pixels which lie on the surface of the bounding volume of the convex hull. Pixels inside the convex hull are superfluous to the next stages of calculation, and would result in excessive complication of the procedures to follow.

Thus the convex hull 801 shown in FIG. 8 is computed by Delaunay triangulation. Unfortunately, definition of the blue background colour in terms of this convex hull would result in excessive computation having to be performed by the processing system 101 when the matte definition is used. This is because, for each pixel in the foreground image, a decision must be made as to whether or not the RGB co-ordinates of that pixel cause it to be located within the convex hull or outside it. Because of the geometric complexity of the shape, this calculation would require a large number of processing steps. So, although a high quality of results would be obtained to define the matte, in the majority of applications this amount of processing time would be prohibitive. Thus it is necessary to define a simplified volume which contains all of the pixel points in RGB space defined by the data sample of the blue background.

Figure 9:
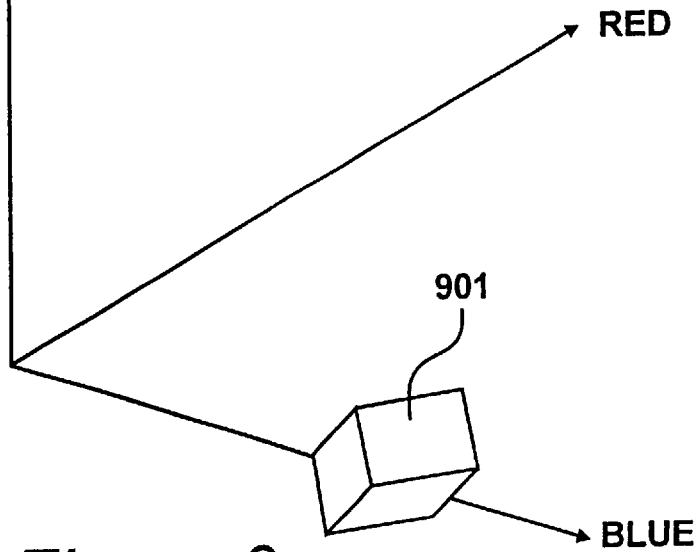
FIG. 9 illustrates a bounding box in colour-space which most efficiently bounds the convex hull shown in FIG. 8.
Figure 12:
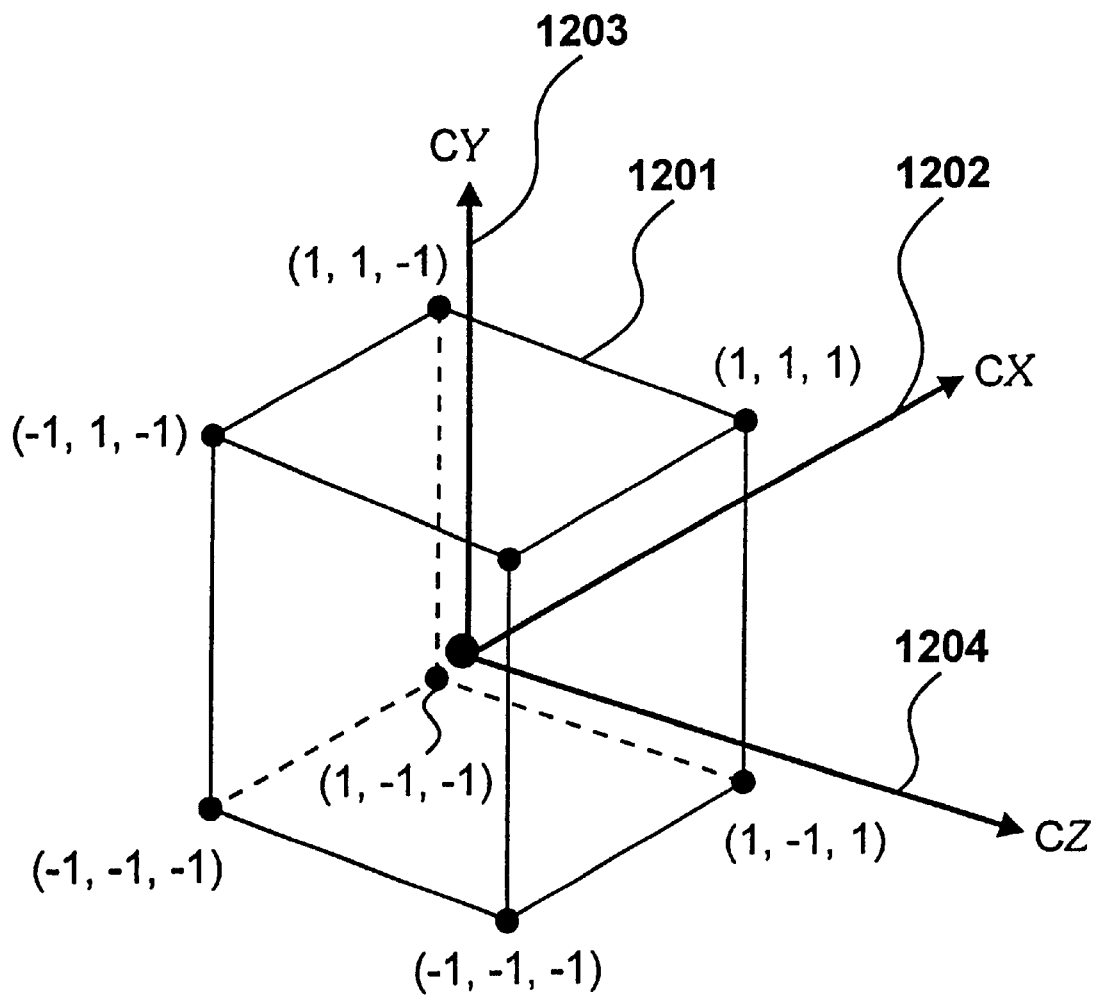
FIG. 12 illustrates a normalised, rotated cube derived from the rectangular box shown in FIG. 9.

The first step in this process of volume simplification is shown in FIG. 9. A rectangular volume 901 is shown, which fully encloses the convex hull 801 shown in FIG. 8. It is possible to define the centre of the rectangular box 901 using the equations shown in FIG. 10. The equations shown in FIG. 11 define scaling factors in each of the red, green and blue directions so as to normalise the rectangular box to a regular cube. A final calculation is performed in order to determine a rotation transformation matrix, which when applied after the scaling process, results in the rectangular box 901 shown in FIG. 1 being rotated and normalised to the cube 1201 shown in FIG. 12, which then resides in a modified colour-space represented by CX, CY and CZ axes, 1202, 1203 and 1204 respectively.

The initial calculations required to determine the rotation are shown in FIG. 13. Essentially, the set of points on the surface of the convex hull 801, determined by the Delaunay Triangulation, are each analysed in turn in order to determine a matrix MC, shown in FIG. 14, from which eigenvectors u, v and w are calculated. The eigenvectors are then used to determine a rotation transformation matrix, which, when applied to a pixel's co-ordinates in colour-space, results in the desired rotation being achieved. This method is detailed in "Graphics Gems 3", pages 301 to 306, in the chapter "A Linear Time Simple Bounding Volume Algorithm", ISBN 0-12-409671-9. Derivation of the eigenvectors is performed in accordance with the Jacobi Method, which is fully described in "Numerical Recipes in C", P463, published by Cambridge Press, ISBN 6-521-431-08-5. Derivation of the rotation from the set of data points on the surface of the convex hull results in a more accurate determination of the rotation than if all the pixels in the volume of the convex hull were used. Furthermore, the time taken to perform the calculations is considerably less.

The RGB values for the centre of the rectangular box 901, calculated as shown in FIG. 10, may be subtracted from colour-space pixel coordinates so that the rectangular box 901 is moved to a position where the centre of the box 901 coincides with the origin of the colour-space axes. This may also be considered as a translation of colour-space, if every pixel under consideration is modified in this way. Having moved the rectangular box 901 to the centre, it is then possible to perform the rotation using the eigenvectors obtained from the calculations shown in FIGS. 13 and 14. Finally, the scaling factors obtained by the calculations shown in FIG. 11 are applied to each pixel in colour-space, thereby resulting in the normalised cube 1201 shown in FIG. 12.

In summary, the three steps are: translation, rotation and scaling. Once modified in this way, colour-space co-ordinates no longer represent red, green and blue values, but instead represent an arbitrary set of orthogonal values created as a result of the pixel modifications outlined above. For convenience it is considered that the new colour-space is represented by CX, CY and CZ co-ordinates, which should not be confused with the x and y co-ordinate systems used for representing the physical location of an image frame.

Figure 15:
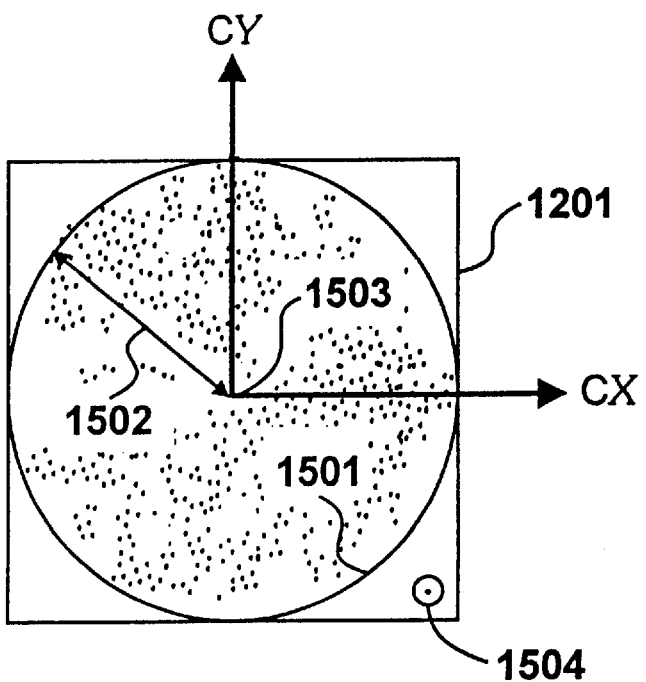
FIG. 15 details a cross section of the cube shown in FIG. 12, including a cross section of a unit sphere and a pixel furthest away from the centre of the unit sphere.
Figure 16:
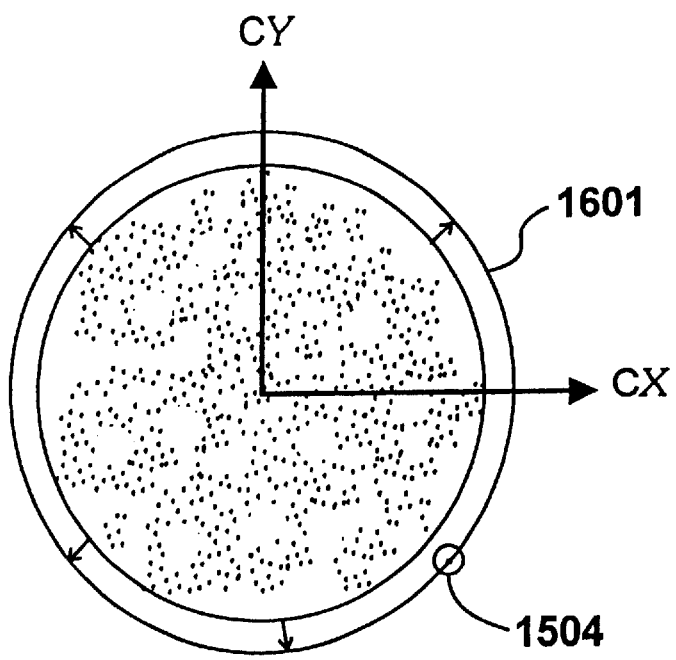
FIG. 16 shows the expansion of the unit sphere to include all pixels shown in FIG. 15.

The cube 1201 is unlikely to be a good approximation of the colour-space volume containing the sampled points. A typical cross section of the cube 1201 in two dimensions is shown in FIG. 15. Here it may be seen that the majority of pixels are likely to reside in a sphere, represented by a circle 1501 of unit radius 1502 surrounding the origin 1503. However, a few points will lie outside this sphere, and in order to determine the correct scaling value to create the unit sphere containing all points it is necessary to find the point 1504 that lies furthest away from the origin 1504. The CX, CY, CZ colour co-ordinates of this point may then be used to generate an additional scaling factor, thus enabling a unit sphere containing all points to be defined, as shown in FIG. 16. The furthest point 1504 from the origin is then located directly at the surface of the enlarged unit sphere 1601. All other points are then guaranteed to be contained within this three dimensional unit sphere within colour-space.

Figure 17:
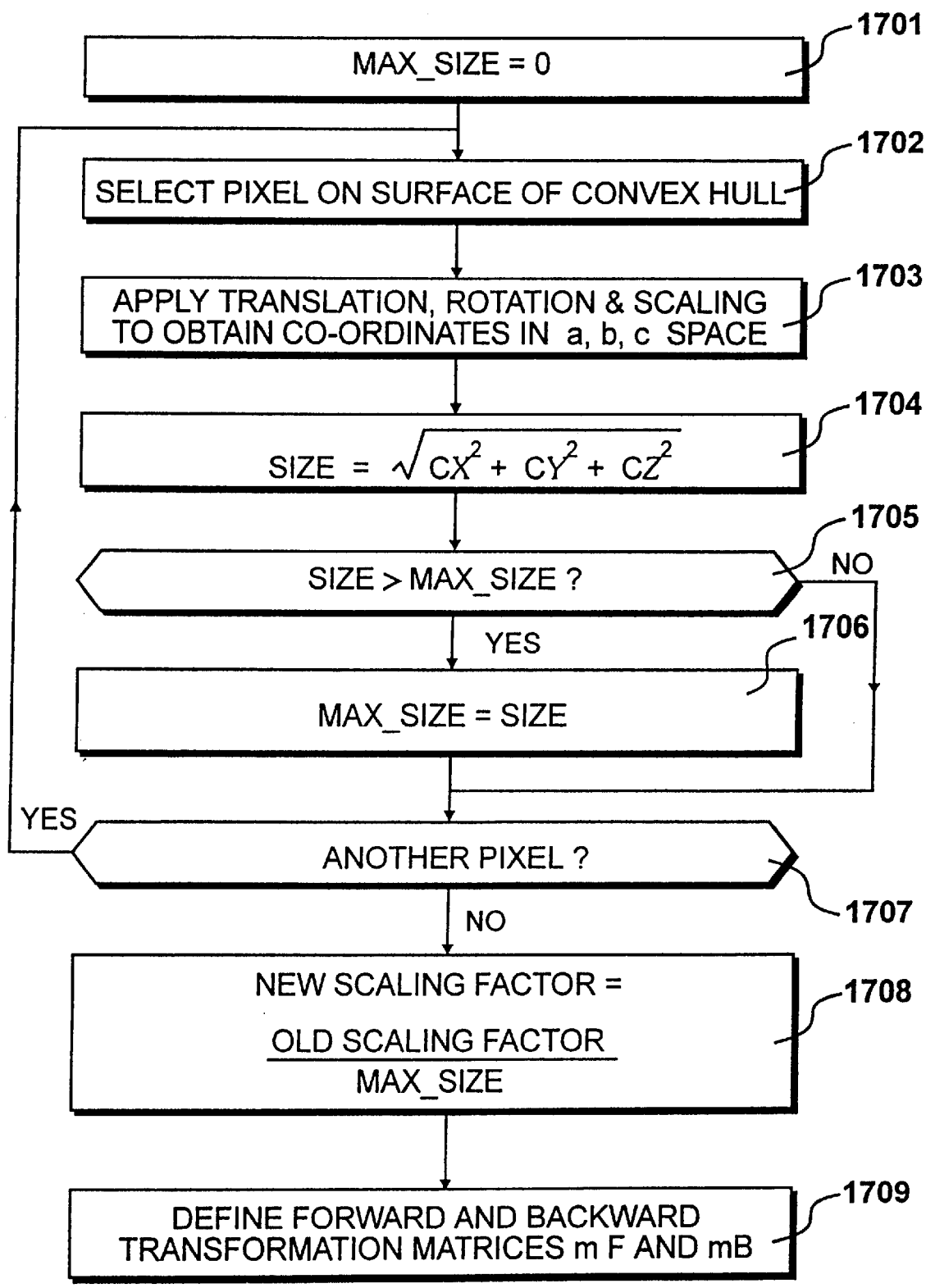
FIG. 17 details processes performed by the processing system shown in FIG. 1 in order to determine a scaling factor required to effect the unit sphere expansion shown in FIG. 16.

The processing steps performed by the processing system 101 to obtain the modified scaling factors for the enlarged unit sphere are shown in FIG. 17. A temporary register location is considered as containing the value for the maximum size of vector connecting the origin to a point CX, CY, CZ in colour-space. At the start of the process, no points have been considered, and it is necessary to reset this register, denoted MAX_SIZE, to zero, as shown in process 1701. In process 1702, a pixel is selected from those which are located on the surface of the convex hull 801. It is not necessary to consider any other points located inside the convex hull for this process, as these will all have smaller vector magnitudes than those at nodes upon the surface of the convex hull. In process 1703, the three steps of translation, rotation and scaling are applied to the RGB values for the pixel, in order to translate them into CX, CY, CZ values for the next stage of the calculation.

In process 1704 the size of the vector in CX, CY, CZ space is calculated in accordance with the square root of the sum of the squares of each of the components. In process 1705, the size is compared with MAX_SIZE. If the size is greater than MAX_SIZE, as it will always be on the first iteration of this process, control is directed to process 1706, where the register containing the value MAX_SIZE is updated with the new value. Alternatively control is directed to process 1707, where a question is asked as to whether another pixel has yet to be analysed. If another pixel remains, control is directed back to process 1702, and the processes just described are repeated for the next pixel on the surface of the convex hull 801.

Alternatively, if all pixels have been considered, control is directed to process 1708, where a new scaling factor is calculated by dividing the previous scaling factor by MAX_SIZE. With this information it is now possible to define forward and backward transformation matrices mF and mB, such that any pixels colour co-ordinates may be translated between RGB colour-space and CX, CY, CZ colour-space. These transformation matrices are defined in process 1709.

Figure 18:
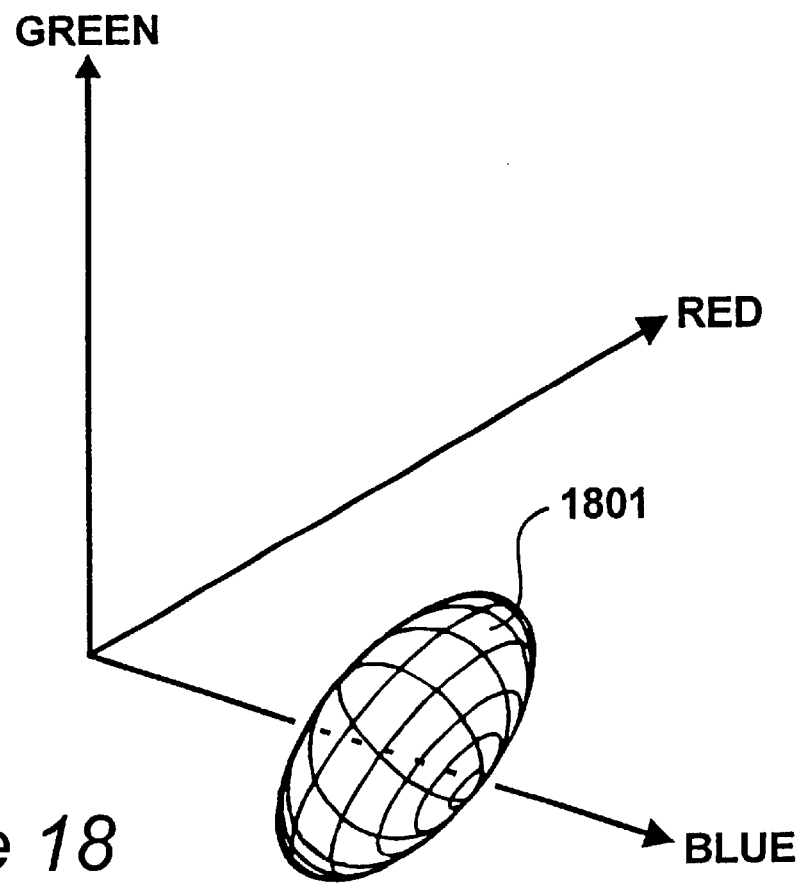
FIG. 18 illustrates the resulting three-dimensional tolerance ellipse when the unit sphere shown in FIG. 16 is viewed in RGB colour-space.
Figure 19:
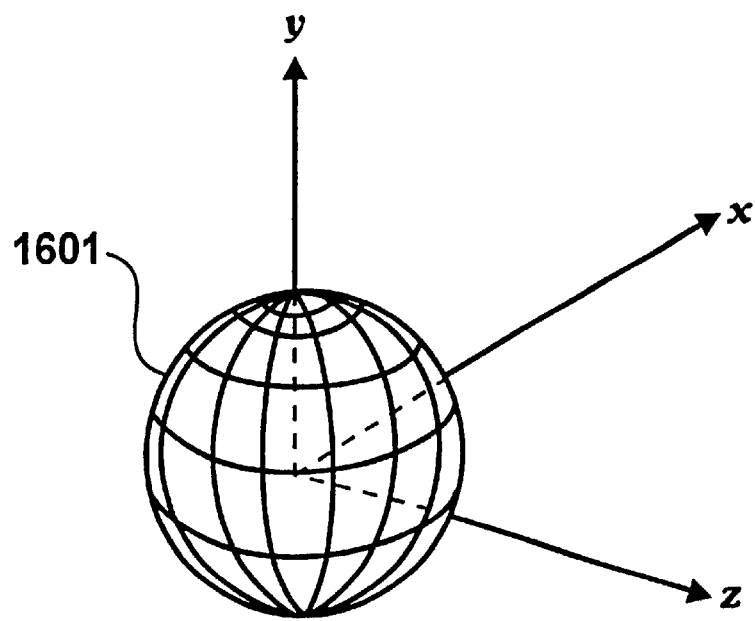
FIG. 19 illustrates the unit sphere in modified colour-space.

The convex hull 801, shown in FIG. 8, is therefore carefully approximated by an ellipse, as shown in FIG. 18. For convenience, a three dimensional ellipse (an ellipsoid) will hereafter be referred to as an ellipse. By applying the forward transformation matrix mF, defined in process 1709, to the ellipse 1801 shown in FIG. 18, this shape is transformed into the unit sphere 1601 represented by the circle in FIG. 16, and the sphere shown in FIG. 19. The centre of the unit sphere 1601 coincides with the origin of the XYZ colour-space axes. This mF transformation matrix simplifies the process of finding out whether or not any arbitrarily chosen RGB pixel co-ordinates reside inside or outside the ellipse 1801.

Figure 20:
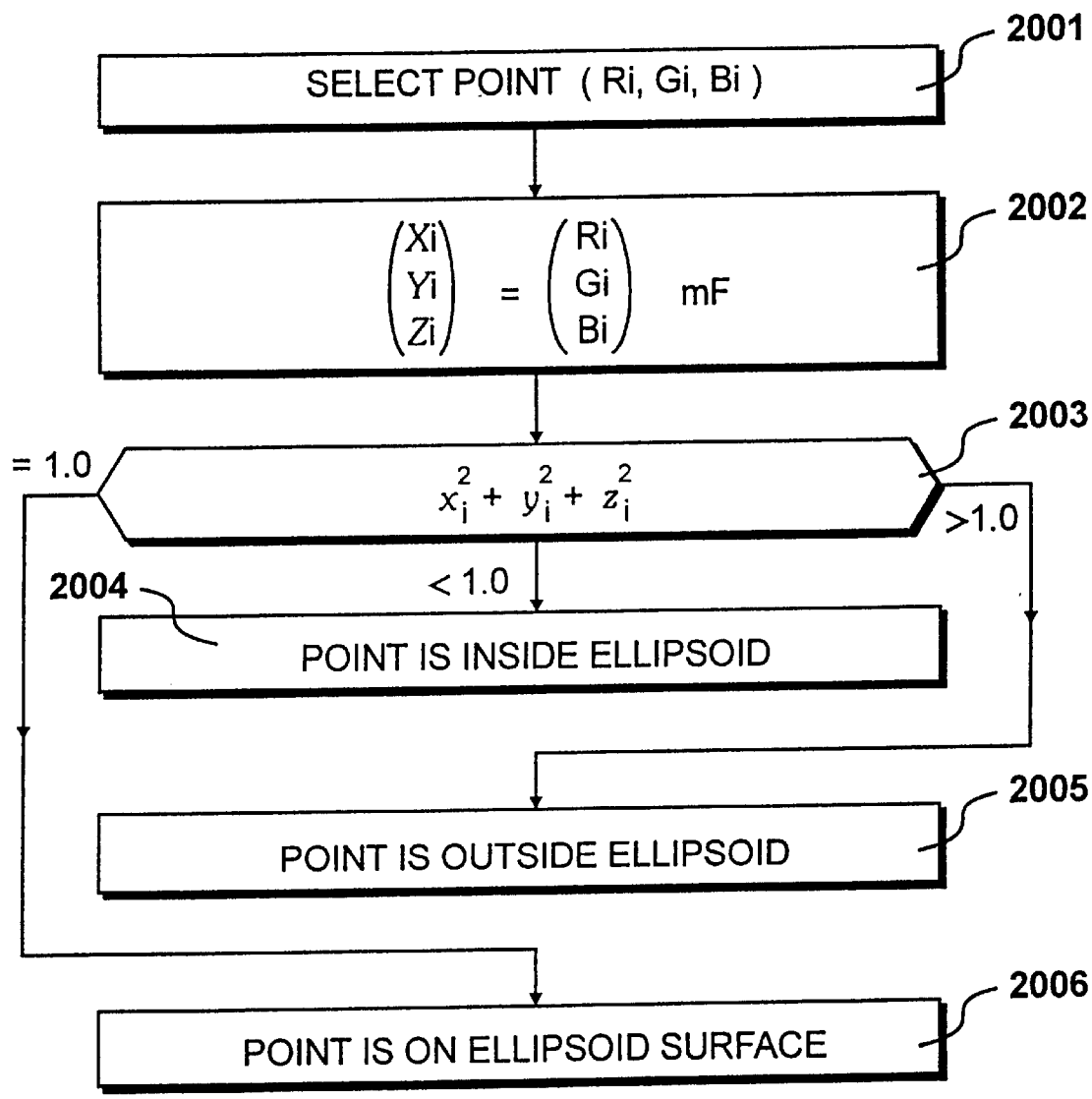
FIG. 20 details processes performed by the processing system to test whether a given pixel is located inside, outside or on the tolerance ellipse shown in FIG. 18.

The processes performed by the processing system 101 to determine whether a pixel is located inside or outside the ellipse 1801 are shown in FIG. 20. At process 2001 a point is selected, having red, green and blue coordinates, denoted Ri, Gi and Bi respectively. In process 2002, the coordinates are transformed by applying the forward transformation matrix mF, in order to obtain modified CX, CY, CZ colour-space co-ordinates, denoted Xi, Yi and Zi respectively.

In process 2003 the sum of the squares of Xi, Yi and Zi are calculated. The square root is not required, as the critical value is unity. Thus, if the sum of the squares is less than one, so will the square root of the sum of the squares be less than one. If the sum of the squares is greater than one, then so is the square root of the sum of the squares. Thus it is not necessary to perform a time-consuming square root calculation. This is the reason for scaling the sphere 1601 to a unit radius.

The result of process 2003 is one of three conditions. If the sum of the squares is greater than one, the point is outside the ellipse 1801, as shown at condition 2005. If the sum of the squares is less than one, the point is inside the ellipse, as represented by condition 2004. If the sum of the squares is exactly equal to 1, which is unlikely to happen, the point is on the ellipse surface, as represented by condition 2006.

With the sequence of processes shown in FIG. 20, it becomes easier to understand why an ellipse is a useful approximation to the convex hull 801. The ellipse may be translated, rotated and scaled to a unit sphere, which then has the key property of having a unit radius. The large number of pixels in an image frame may each be efficiently tested for inclusion or exclusion within the volume of colour-space bounded by the ellipse, by testing the colour vector of the pixel after the forward transformation matrix has been applied to its RGB values. The ellipse represents the closest possible ellipseal approximation to the convex hull 801, thereby representing a highly efficient compromise between speed and accuracy for applications such as compositing, where it is necessary to efficiently determine whether a pixel resides in the background colour volume.

In compositing, a strict binary decision as to whether a pixel is a foreground pixel or a background pixel would generate a considerable level of distortion in border regions, where a level of blending is required. The convex hull and the ellipse which are used to define the background colour volume are referred to herein as the tolerance hull and tolerance ellipse respectively. In order to define a blending process, a softness hull and a resulting softness ellipse are defined. Thus, in the same way that pixels representing absolute background colour values may be sampled and used to define the tolerance ellipse, pixels at border regions in the image, such as at the edges of foreground objects, such as the guitarist's hair 205, the translucent regions of the wine bottle 202 and the wine glass 203 may be sampled to define a larger volume of colour-space such that a softness ellipse can be determined. This ellipse is called a softness ellipse, because it enables the transition edges of the foreground and background images to be softened, thereby resulting in a more convincing composited image.

Figure 21:
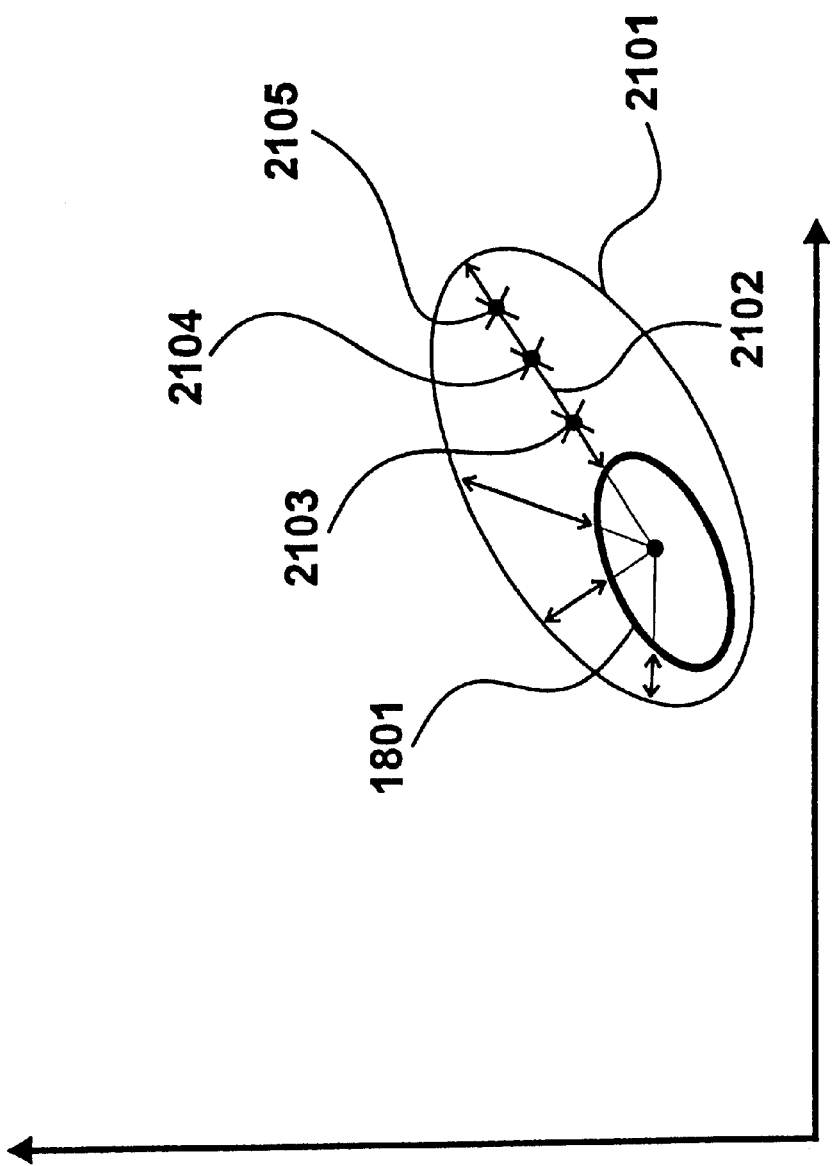
FIG. 21 illustrates a softness ellipse for improving the quality of border and intermediate colour regions of a composited image, and the tolerance ellipse shown in FIG. 18.

A tolerance ellipse is shown in two dimensional cross section in FIG. 21. The tolerance ellipse 1801 occupies a smaller volume of colour-space than the softness ellipse. The softness ellipse is determined from pixel samples in exactly the same way as for the tolerance ellipse. This results in a pair of forward transformation matrices: mFT and mFS, for the tolerance and softness ellipses respectively. It is then possible to determine whether any particular RGB value resides in any one of three spaces: inside the tolerance ellipse 1801, representing a background colour and a matte pixel value of 0.0, outside the softness ellipse 2101, representing a foreground colour, and a matte pixel value of 1.0, or in the volume between the tolerance and softness ellipses, corresponding to a matte pixel value or softness value of between 0.0 and 1.0.

The intermediate values are calculated by considering a vector 2102, which originates at the origin of the tolerance ellipse 1801 and which intersects the point 2104 under consideration. The distance of the point 2104 along this vector 2102 from the surface of the tolerance ellipse 1801 to the softness ellipse 2101, as a proportion of the total distance between the two ellipses at the point where they intersect this vector, determines the fractional softness value in the range 0.0 to 1.0. Thus a point 2103 close to the tolerance ellipse may have a softness value of 0.25. A point 2104 half way along the vector 2102 may have a softness value of 0.50, and a point 2105 close to the softness ellipse may have a softness value of 0.80.

Figure 22:
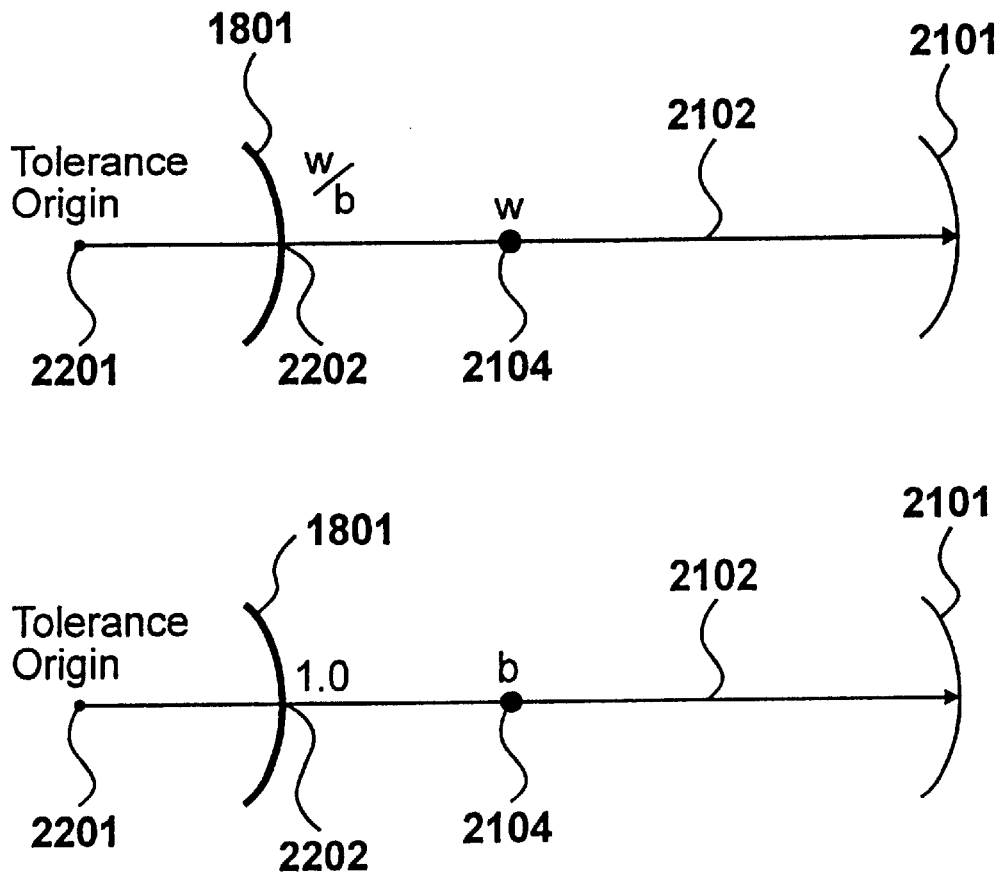
FIG. 22 details a mathematical procedure for determining a softness value for colour co-ordinates of a pixel between the tolerance ellipse and softness ellipse shown in FIG. 21.

A diagrammatic representation of the calculations required to determine the softness value of the point 2104 is shown in FIG. 22. The vector 2102, may have positions along its length considered as existing in tolerance colour-space, as defined by applying the tolerance transformation matrix mFT to these points. Alternatively, these same positions may be considered as existing in softness colour-space, as defined by applying the softness transformation matrix mFS to the positions.

Thus, given the RGB co-ordinates of the origin of the vector 2102, which is the centre 2201 of the tolerance ellipse 1801, these may be transformed by applying the softness transformation matrix mFS to give the co-ordinates of the origin in softness colour-space.

The point 2104 under consideration along the vector is also transformed in this way. The value w, of the distance of the point along this vector may be calculated according to the method described in "Graphics Gems 3", P275, "Intersecting a Ray with a Quadric Surface", ISBN 0-12-409671-9. The position 2202 along the vector 2102 that intersects the tolerance ellipse 1801 is unknown at this stage, but is given the value w/b, where w has just been found, but b is unknown. To determine the value of b, the RGB co-ordinates for the point are transformed from RGB space to tolerance space using the tolerance forward transformation matrix MFT. Then, the tolerance origin is simply (0,0,0), and the distance to the point 2104 along the vector 2102 may be calculated by the square root of the sum of the squares of CX CY and CZ, to give the value of b. The remaining equation in FIG. 22 enables the required softness value to be calculated.

The first graph shown in FIG. 22 represents the softness ellipse scale and the second graph represents the tolerance ellipse scale. The variable w may be considered as the white position in softness space and the variable b may be considered as the black position in tolerance space.

Figure 23:
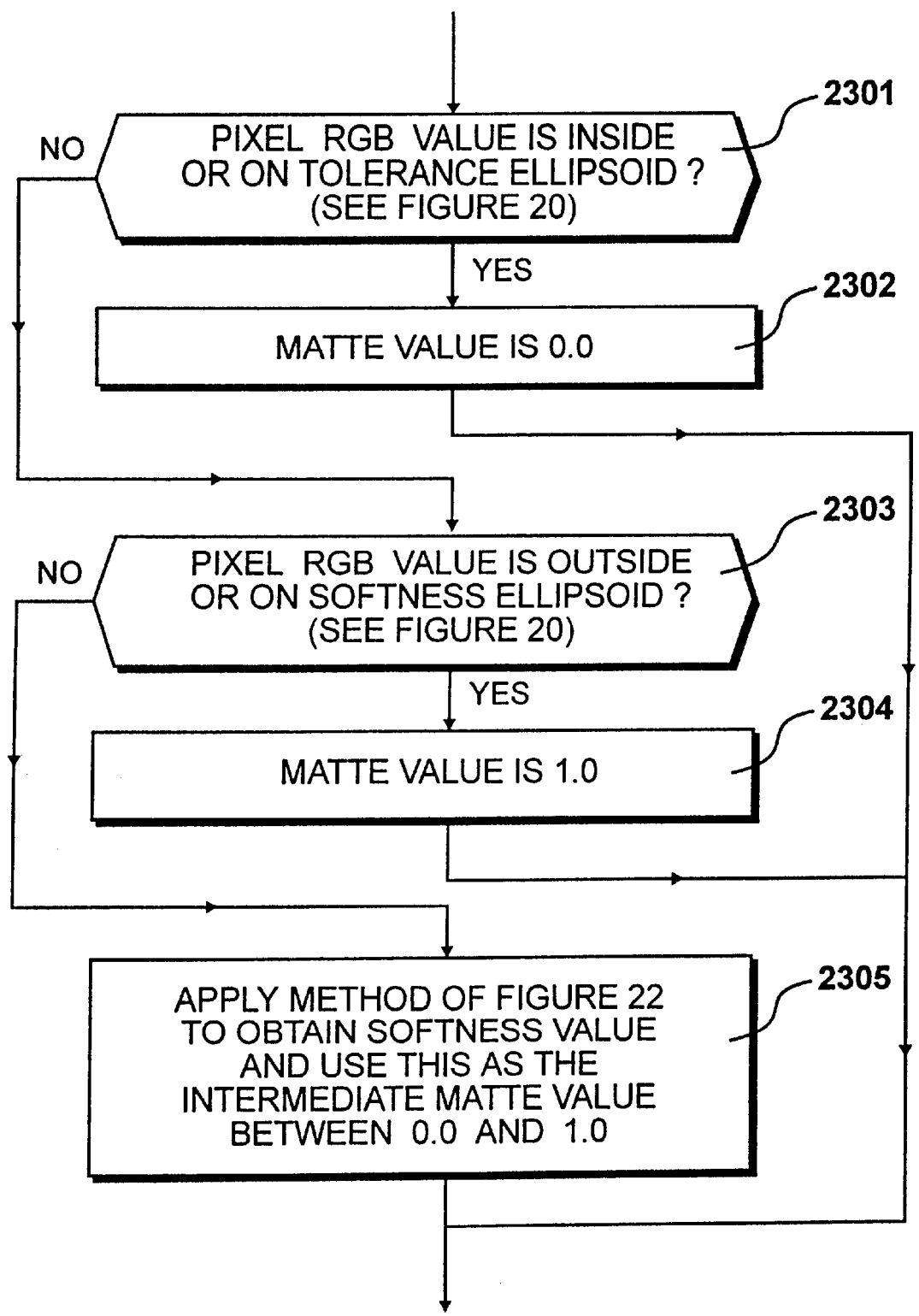
FIG. 23 details processes performed by the processing system to determine a control, matte, key or alpha value in response to a pixel RGB coordinate in colour-space containing the tolerance and softness ellipse shown in FIG. 21.

The processes performed by the processing system 101 to generate a matte pixel value between 0.0 and 1.0, from an individual RGB pixel value, are shown in FIG. 23. Other applications, other than compositing, may also use these processes, so the matte value is generalised to being a control value, which may be used in a variety of related operations. In process 2301, a question is asked as to whether the pixel RGB value is inside or on the tolerance ellipse. This is computed in accordance with the processes shown in FIG. 20. If the pixel is anywhere inside the tolerance ellipse, the control value is set to 0.0, as indicated at process 2302. Alternatively, if the pixel RGB value is outside the tolerance ellipse, control is directed to process 2303, where a question is asked as to whether the pixel resides outside or on the softness ellipse. Again, this condition is identified by performing the processes shown in FIG. 20.

If the pixel RGB value is anywhere outside the softness ellipse, the control value is set to 1.0, as indicated at process 2304. Alternatively, if the pixel RGB value is determined as lying inside the softness ellipse, it is understood that it must reside in the intermediate region between the tolerance and softness ellipses, and a softness value must be calculated. At process 2305 the softness value is calculated in accordance with the method outlined in FIG. 22, and this is used as the control value. Clearly more processing resources are required for pixels that lie between the softness and tolerance ellipses. Fortunately, however, this usually represents a small minority of the pixels in a typical frame, as most pixels will be either in the foreground or the background. For this reason the additional complexity required to calculate the softness does not usually result in significantly more processing resources being required.

The matte resulting from processing a portion 205 of the image shown in FIG. 2, containing a strand of the guitarist's hair, is detailed in FIG. 24. Here pixels are seen where the guitarist's hair crosses sub-pixel boundaries. The processes described above for identifying tolerance and softness ellipses in colour-space enables matte pixel values to be generated which are appropriate to the blending of foreground and background images in a way that provides a high degree of realism.

The present embodiment provides users with a way of manipulating colour-space ellipses directly by actually displaying a colour-space environment. Familiarity with the colour-space ellipses and their effect results in high quality compositing, and other effects, to be attained far more quickly than would otherwise be the case, because the user is able to interact directly with colour representations in a meaningful way. Thus, in addition to providing the user with a display of a foreground image, the resulting matte, and the composited image on the monitor 104, the processing system 101 also supplies signals to the monitor 104 such that various representations of colour-space objects can be shown, at the same time as the corresponding image. Thus effects resulting from a particular arrangement of objects in colour-space can be closely related to the composited image.

Figure 25A:
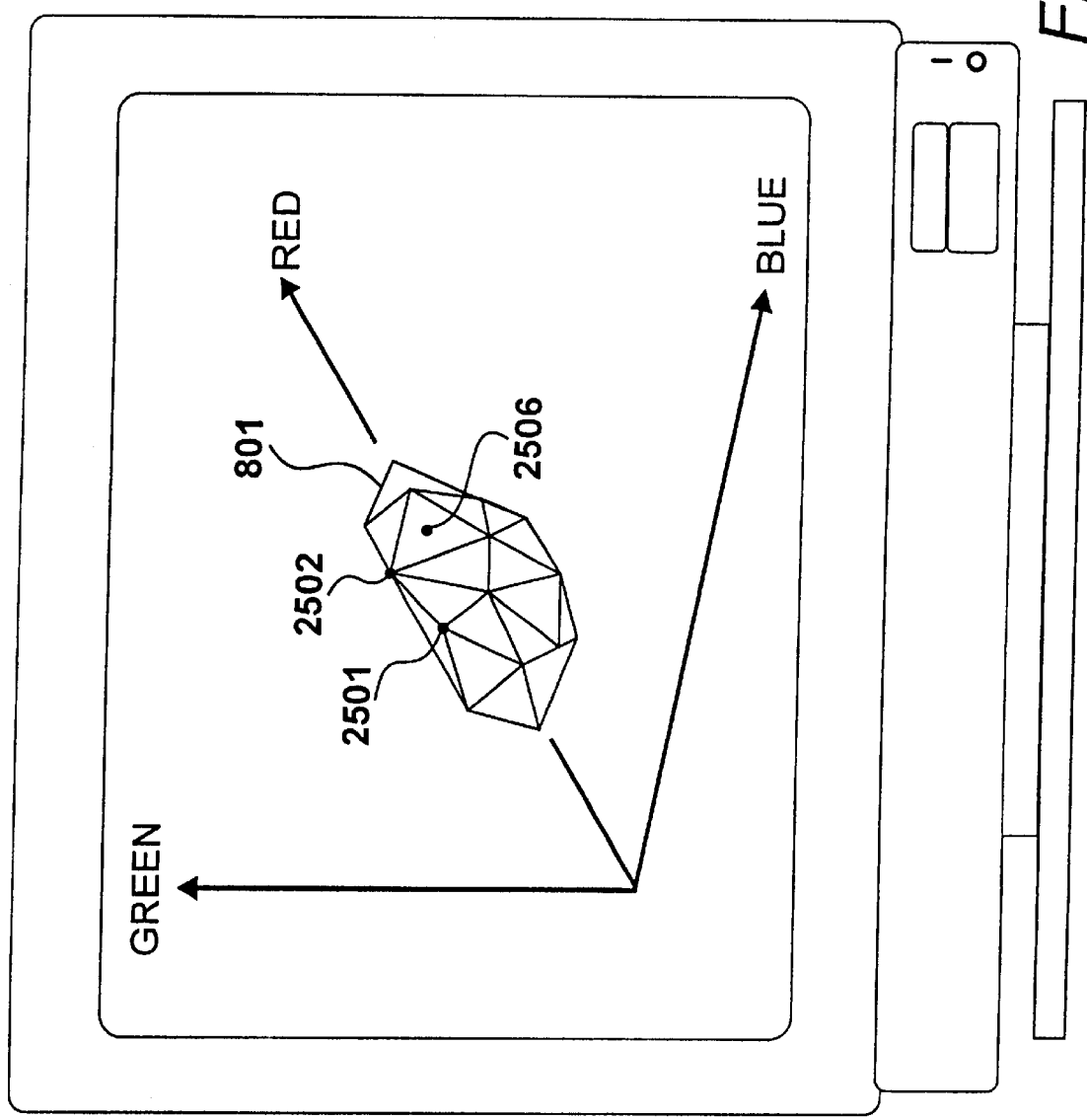
FIG. 25 illustrates a user-interactive display of the convex hull shown in FIG. 8.
Figure 25B:
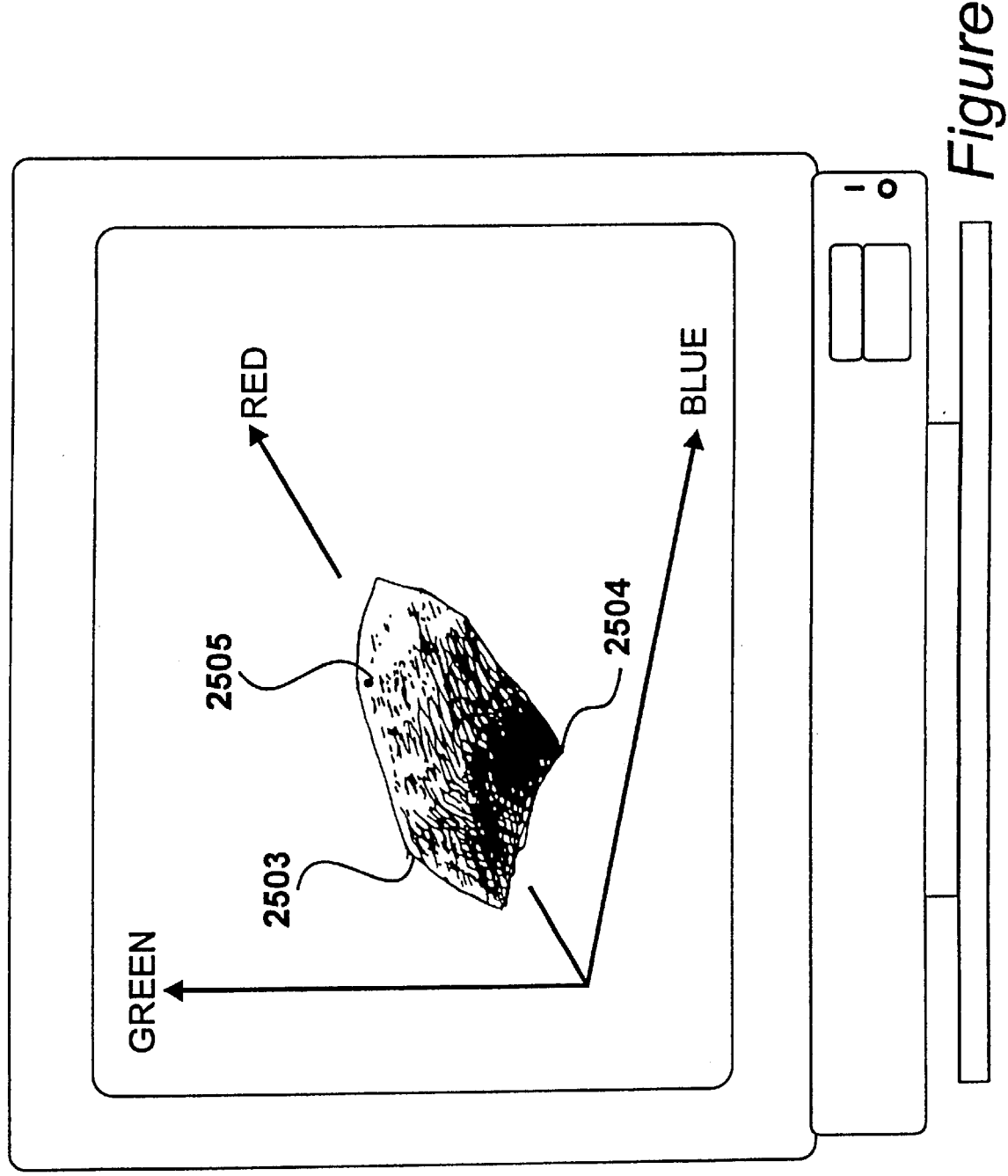

By providing a two dimensional projection of the three dimensional colour-space on the monitor 104, several colour-space objects may be viewed and subsequently manipulated. Fundamental to the process of compositing is the convex hull 801, which represents RGB values of sampled pixels. A displayed convex hull 801 is shown in FIG. 25A and FIG. 25B. In its first form, 801, a tessellated surface to the volume is shown, with each node 2501, 2502 corresponding to a pixel RGB value on the outside of the volume. In the second form the surface tessellations are not shown and are replaced by colour shaded surfaces having smooth transitions. The colour at any point on the surface is given by its actual points in RGB space. Thus a smooth colour variation across the surface of the volume gives a correct indication to the eye of the actual colours represented by the enclosed volume.

The colour at point 2504 on the surface of the convex hull 2503 has low values of red and green, but a medium value for blue. Thus this point is coloured in accordance with these respective proportions of colour, as a medium blue. Point 2505 contains higher values for red, green and blue, and is plotted as a higher brightness pixel, again with the proportions of colour being in accordance with its position relative to the RGB colour-space axes. Viewing options are provided by the processing system 101 such that the colour-space axes may be rotated, thus making it possible to view the convex hull from all sides, the particular view preferred being dependant upon the precise nature of the artefacts which the user is attempting to avoid in the final composited image.

Each component plane 2506 on the surface of the convex hull is considered as being related to three defining points at its three corners. Each of these points is determined by a pixel having an RGB value, which determines its colour and position in colour-space. For points across this triangular plane, the colour may be determined by linear interpolation in two dimensions between the three points. This type of shading is known as Gouraud shading and has an advantage in that many processing systems of the type indicated in FIG. 1 include specialised hardware for implementing this type of shading, thereby facilitating a high degree of processing efficiency.

In addition to displaying the convex hull, the processing system 101 may supply signals to the monitor 104 such that the ellipse approximation, used for calculations in colour-space, may also be displayed as a two dimensional projection of three dimensional colour-space. The ellipse may be shown as a wire-frame, as indicated in FIG. 18, or with Gouraud surface shading, to provide an intuitive link with the colours being represented.

When displayed as a wire-frame it becomes possible to superimpose the wire-frame ellipse upon the convex hull, thus enabling visualisation of the accuracy which this approximation represents. Using wire-frame projections of the ellipse permits both the tolerance and softness ellipse to be displayed simultaneously. The system processor allows the user to select which of the ellipses and convex hulls is displayed, and whether these should be in wireframe or colour shaded solid form. Furthermore, the RGB axes of the colour-space projection on the monitor may be rotated so as to form a preferred view of the colour-space objects and thereby improve visualisation and identification of potential solutions to process artefact removal.

Once colour-space objects have been displayed in this way, it becomes possible, by appropriate user manipulation of the stylus 102, to modify these objects in order to improve the quality of the resulting composited image. Thus, instead of sampling pixels on the displayed image as described above, the user may modify the ellipses directly, using several types of three dimensional shape modifying tools.

Figure 26A:
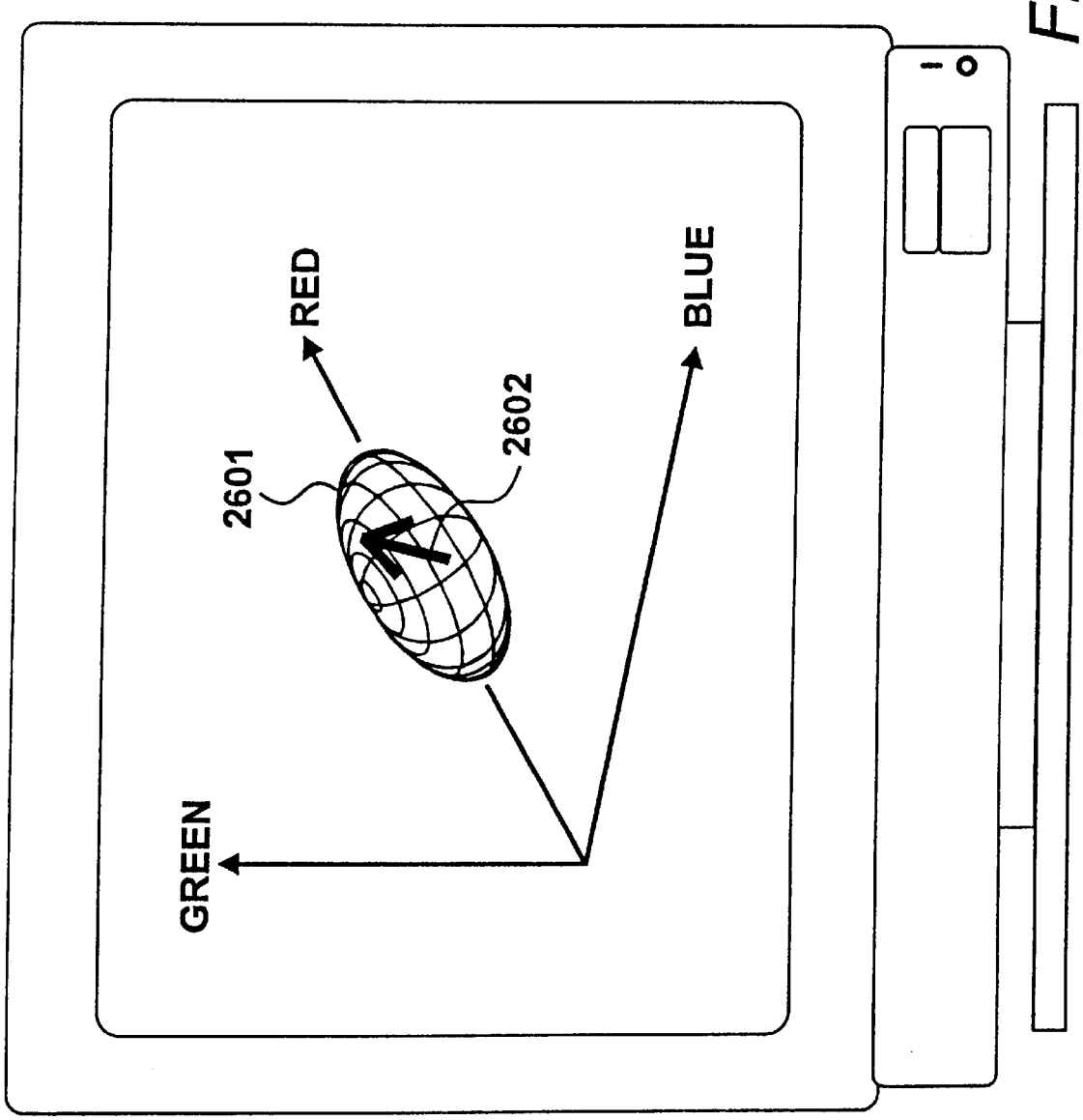
FIG. 26 illustrates user-interactive views of a control arrow on an ellipse of the type shown in FIG. 18.
Figure 26B:
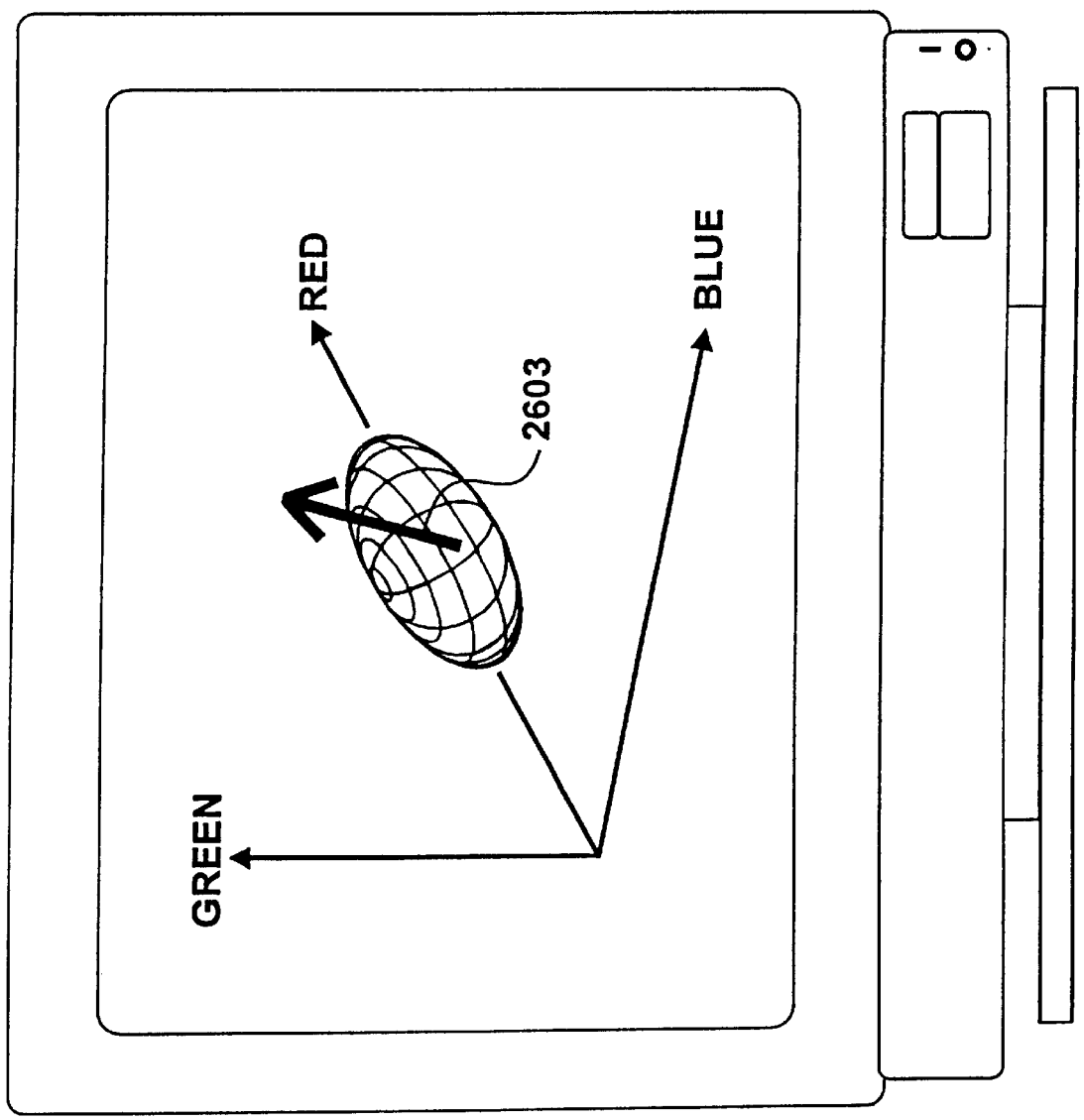
Figure 26C:
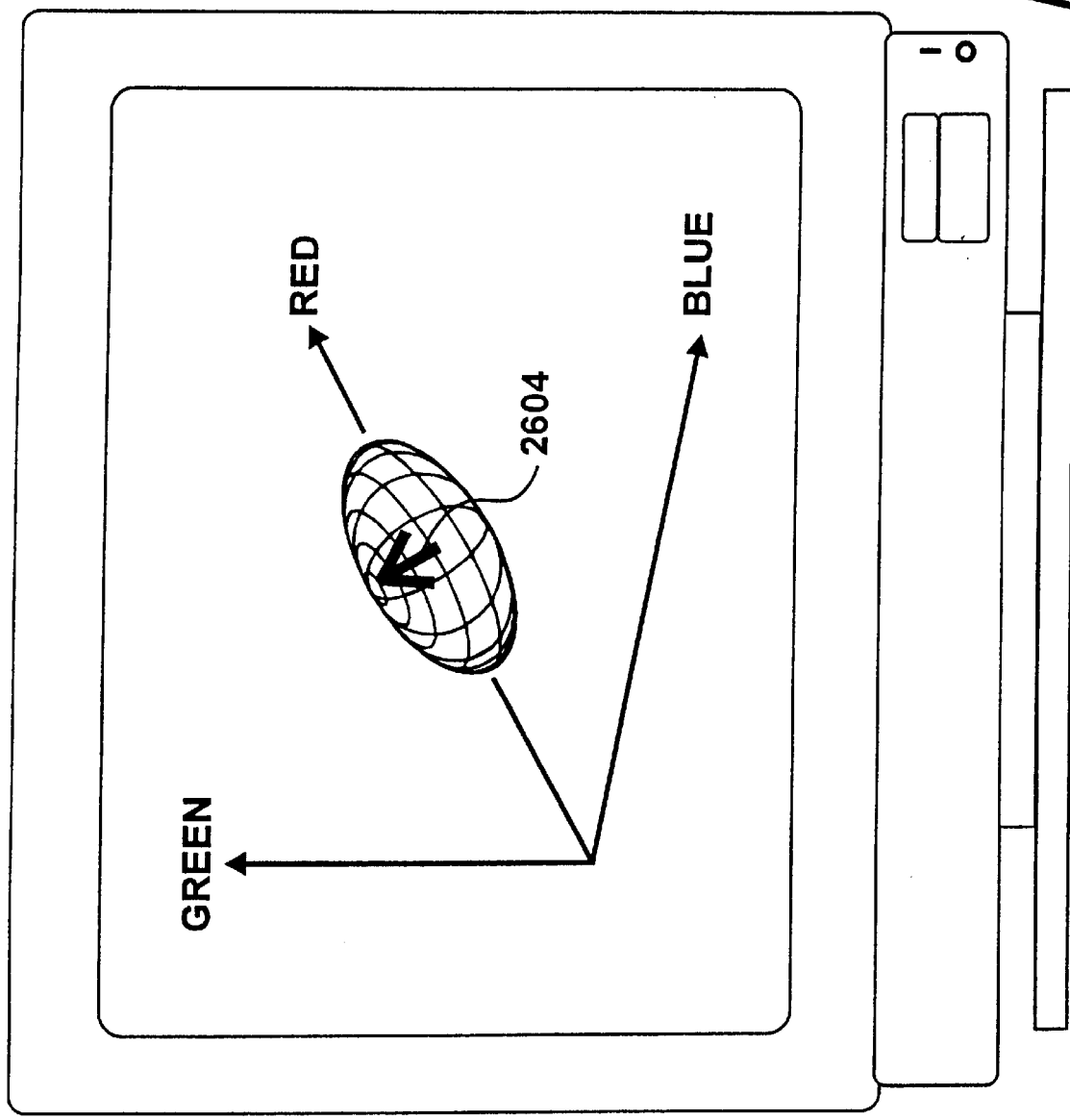

Preparations for defining a three dimensional transformation are shown in FIG. 26. An ellipse 2601 is shown as a wire-frame model in a set of RGB axes generated by the processing system 101 and displayed on the monitor 401. A short control arrow 2602 is displayed, originating from the centre of the ellipse 2601. The arrow may be considered as having a constant length and may be rotated in any direction about the centre of the object to which it is attached. Thus the length and angle of the arrow indicates the direction in which a transformation is to be applied. The length of the arrow does not relate to the magnitude of the effect; this is merely a consequence of projecting its image onto the two dimensions of the screen of the monitor 104.

The position of the arrow may be adjusted by user manipulation of the stylus 102. Thus, the short arrow 2602 represents a transformation effect in a direction nearly perpendicular to the screen of the monitor 104. The long arrow 2603 represents a transformation effect in a direction largely parallel with the screen of the display monitor 104, and the short arrow 2604 represents a transformation effect away from the green axis, largely perpendicular to the screen.

Figure 27A:
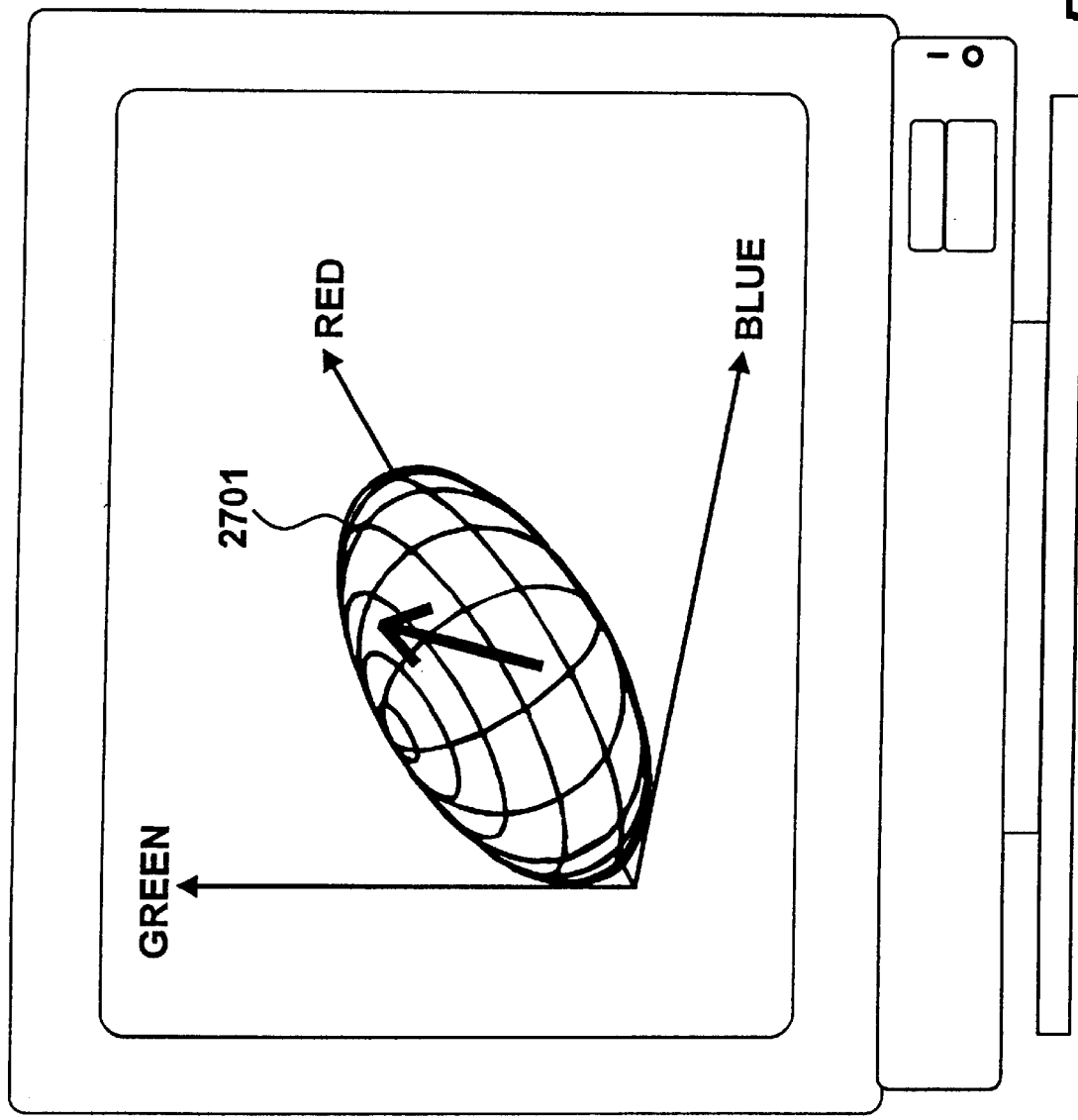
FIG. 27 illustrates the result of user manipulation of the control arrow and ellipse shown in FIG. 26.
Figure 27B:
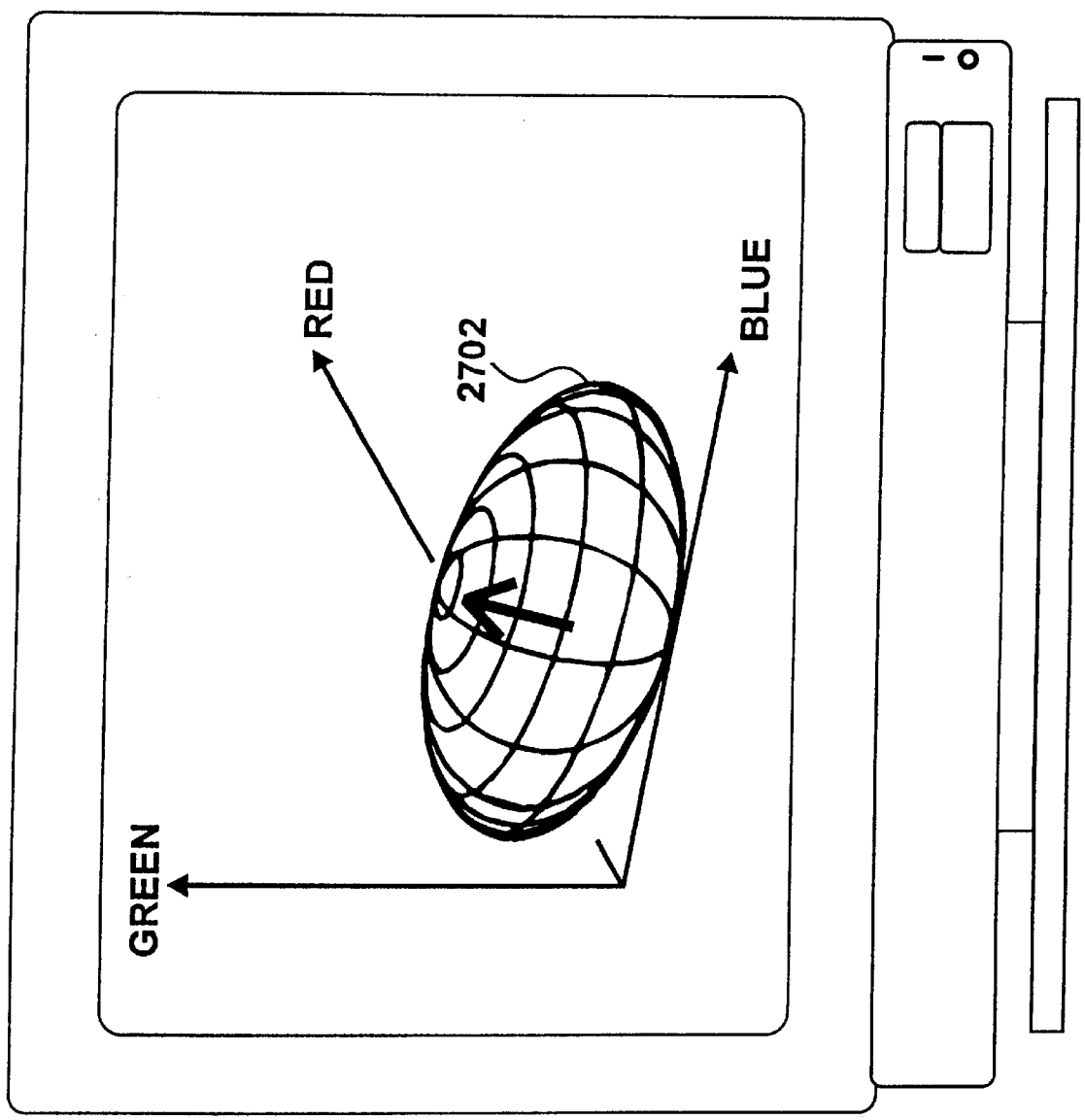

FIG. 27 details two resulting transformations of the ellipse 2601 shown in FIG. 26. The enlarged ellipse 2701 results from a stretch operation carried out in accordance with the position of the control arrow 2604. The magnitude of the stretch may be determined by typing in a numerical value, such as 1.3, or by dragging the stylus 102, with the stylus button held down. An alternative result is represented by the rotated ellipse 2702. The rotation has been carried out with respect to the origin.

Figure 28:
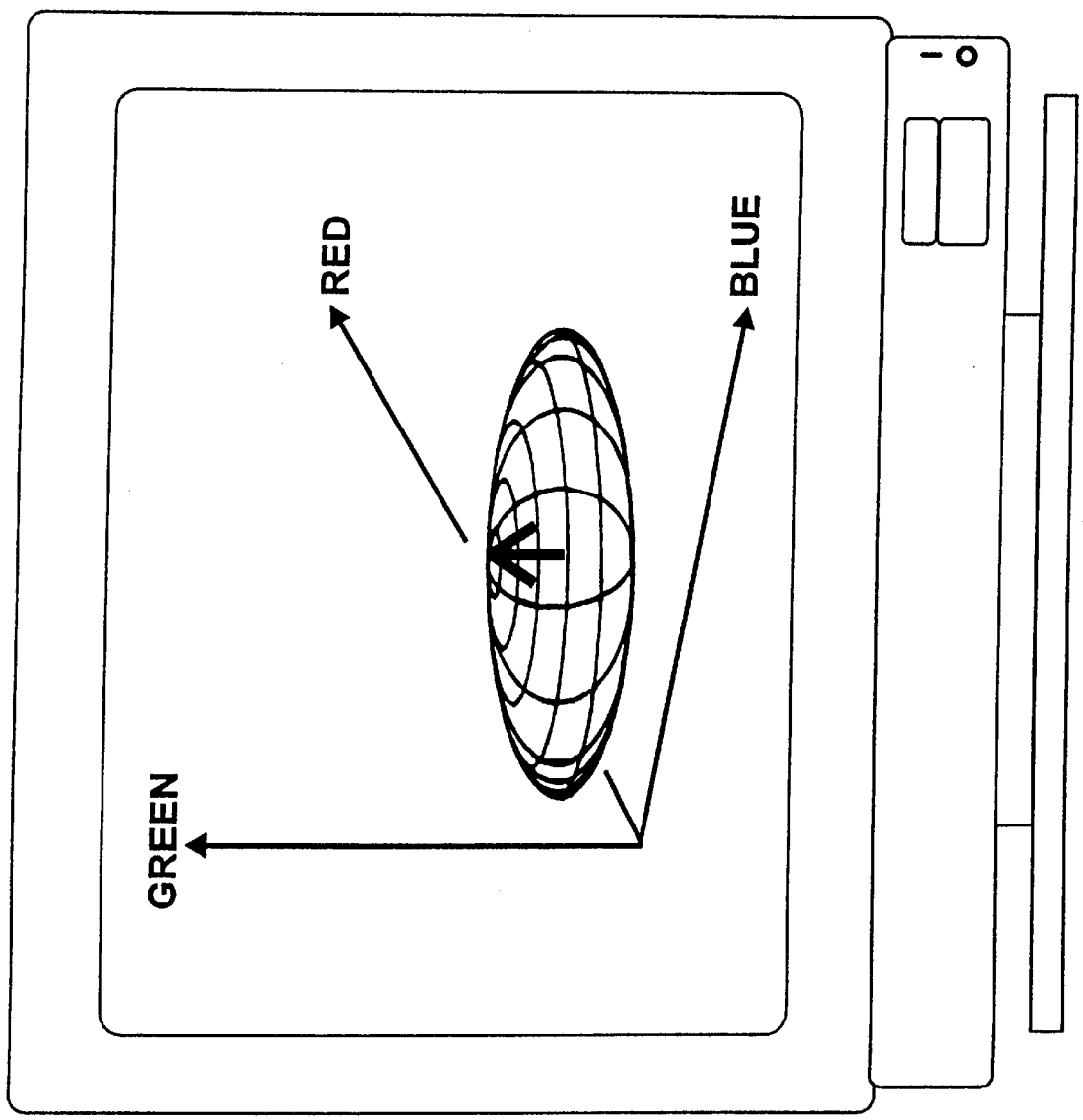
FIG. 28 illustrates the result of a user-defined stretch function applied to an ellipse of the type shown in FIG. 18.

The result of a stretch operation is shown in FIG. 28. Thus the user has complete control over the shape of the three dimensional ellipse. The corresponding convex hull, to which the ellipse is an approximation, is automatically transformed in this way also, thus maintaining the mathematical relationship between the two.

In summary, there are six functional transformations of three dimensional colour-space objects that may be achieved by manipulation of the control arrow. These functions are:

F1—Translate in the direction of the arrow.

F2—Rotate

F3—Scale globally from the object's centre.

F4—Scale globally from the opposite edge.

F5—Proportional scaling or stretch from the object's centre.

F6—Proportional scaling from the opposite edge.

The function is selected by pressing and holding the appropriate function key on keyboard 105 while dragging the control arrow using the stylus 102.

Figure 29:
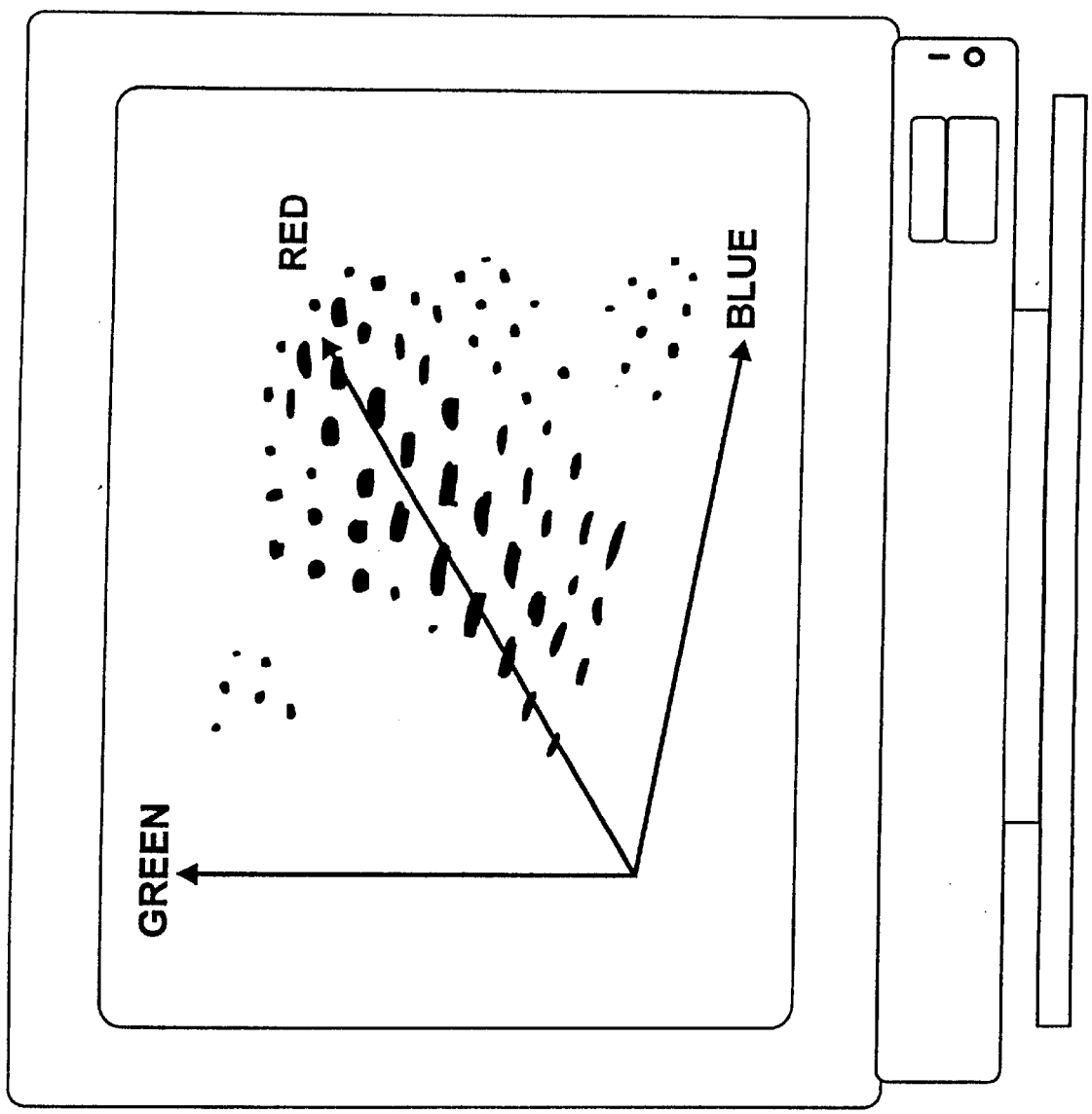
FIG. 29 illustrates the color content of an entire image.

In many instances it is useful to visualise the colour content of an entire image, or a sampled portion of an image. FIG. 29 shows a histogram display of colour-space in which the magnitude of pixels in a quantised region of colour-space is represented by a small histogram, also drawn in the average colour of that region of colour-space. The histogram is plotted in the three dimensions of colour-space at a co-ordinate representing the centre of the region that is being quantified. Thus, red, green and blue co-ordinates of pixels in an image determine three displayed characteristics: firstly the location of a histogram, secondly the colour of the histogram, and thirdly the height of the histogram.

The histogram display shown in FIG. 29 is quantised by dividing each of the red, green and blue axes into eight sections. The user may select different quantisations, such as sixteen, thirty-two or sixty-four, in order to represent the data most clearly. At a quantisation level of sixty-four, it is possible that the histogram display may become cluttered, or require a very high display definition to be understood clearly. Under some circumstances, however, even such a cluttered display will provide important information to the user about the colour content of an image frame.

The histogram is particularly useful for enabling the user to determine how well a tolerance or softness ellipse is likely to perform, as regions on the histogram display may clearly identify distinct regions for blue key colour as distinct from talent foreground colours. Also, places where differences are marginal will be clearly seen. The tolerance and softness ellipses may be superimposed upon the histogram display, so that an appropriate stretch or other transformation can be identified and applied to an ellipse, thereby improving the overall efficiency of the compositing process considerably.

What is claimed is:

1. A method of producing a chroma key in an image data compositing method which comprises applying a rotational transformation to data representative of pixels in RGB color-space to produce a modified color space wherein a geometric positions of the pixels relates to a color of the pixels with no bearing on a location of the pixels within an original image frame, wherein:

(a) said data representative of pixels comprises a bounding volume that contains or bounds displayed pixels; and (b) RGB values for a centre of the bounding volume are subtracted from RGB color-space pixel coordinates comprising the bounding volume to move or translate coordinates of the centre of the bounding volume to the origin of RGB color-space axes, the rotational transformation thereafter being applied to the centralised bounding volume.

2. A method as claimed in claim 1 which said bounding volume is any one of a cuboid, a convex hull, an ellipsoid.

3. A method as claimed in claim 1, further comprising scaling the rotationally transformed pixel data to produce a normalised unit cube containing all the pixels contained within the bounding volume.

4. A method as claimed in claim 3, further comprising scaling the normalised unit cube to produce a sphere containing all points to be defined.

5. A method as claimed in claim 1 which the bounding volume is a convex hull which has been approximated to an ellipsoid.

6. A method as claimed in claim 5 in which the color-space ellipsoid is directly manually manipulable by an operator.

7. A method as claimed in claim 1 in which there are two bounding volumes the first being a tolerance volume and a second being a softness volume, the tolerance volume defining the background color volume and the softness volume, being larger than the tolerance volume, and defining an area in which the background and foreground pixels are blended.

8. Apparatus for producing a chroma key in an image data composing system comprising means to apply a rotational transformation to data representative of pixels in RGB color-space to produce a modified color space in which the geometric positions of the pixels relates to their color only with no bearing on their location within an original image frame, wherein said data representative of pixels comprises a bounding volume that contains or bounds displayed pixels, and the apparatus further comprises means for subtracting RGB values for a centre of the bounding volume from RGB color-space pixel coordinates comprising the bounding volume to move or translate coordinates of the centre of the bounding volume to the origin of RGB color-space axes, the rotational transformation thereafter being applied to the centralised bounding volume.

9. Apparatus as claimed in claim 8 in which said bounding volume is any one of a cuboid, a convex hull, an ellipsoid.

10. Apparatus as claimed in claim 8 having means for sealing the rotationally transformed pixel data to produce a normalised unit cube containing all the pixels contained within the bounding volume.

11. Apparatus as claimed in claim 10 having further means for sealing the normalised unit cube to produce a unit sphere containing all points to be defined.

12. Apparatus as claimed in claim 8 in which bounding volume is a convex hull which has been approximated to an ellipsoid.

13. Apparatus as claimed in claim 12 having means for manually manipulating the color-space ellipsoid by an operator.

14. Apparatus as claimed in claim 8 having means for forming two bounding volumes the first being a tolerance volume and a second being a softness volume, the tolerance volume defining the background color volume and the softness volume, being larger than the tolerance volume, and defining an area in which the background and foreground pixels are blended.

* * * * *

UNITED STATES PATENT AND TRADEMARK OFFICE
CERTIFICATE OF CORRECTION

PATENT NO.    : 6,496,599 B1
DATED         : December 17, 2002
INVENTOR(S)   : Daniel Pettigrew It is certified that error appears in the above-identified patent and that said Letters Patent is hereby corrected as shown below:

<u>Column 13,</u>
Line 56, "positions" should read -- position --

<u>Column 14,</u>
Line 15, after "1" insert -- in --
Line 28, "composing" should read -- compositing --
Line 51, after "which" insert -- the --

Signed and Sealed this

Tenth Day of June, 2003

JAMES E. ROGAN
*Director of the United States Patent and Trademark Office*